United States Patent
Chung

(10) Patent No.: US 8,892,537 B2
(45) Date of Patent: Nov. 18, 2014

(54) SYSTEM AND METHOD FOR PROVIDING TOTAL HOMEPAGE SERVICE

(75) Inventor: Hee Sung Chung, Seoul (KR)

(73) Assignee: Neopad Inc., Seoul (KR)

( * ) Notice: Subject to any disclaimer, the term of this patent is extended or adjusted under 35 U.S.C. 154(b) by 639 days.

(21) Appl. No.: 13/203,942

(22) PCT Filed: Nov. 3, 2009

(86) PCT No.: PCT/KR2009/006427
§ 371 (c)(1),
(2), (4) Date: Aug. 30, 2011

(87) PCT Pub. No.: WO2011/007935
PCT Pub. Date: Jan. 20, 2011

(65) Prior Publication Data
US 2011/0313997 A1    Dec. 22, 2011

(30) Foreign Application Priority Data

Jul. 15, 2009 (KR) .................. 10-2009-0064491
Jul. 15, 2009 (KR) .................. 10-2009-0064493
Jul. 16, 2009 (KR) .................. 10-2009-0064817

(51) Int. Cl.
*G06F 7/00* (2006.01)
*G06F 17/30* (2006.01)

(52) U.S. Cl.
CPC ................. *G06F 17/3089* (2013.01)
USPC ............ 707/705; 715/234; 715/243

(58) Field of Classification Search
None
See application file for complete search history.

(56) References Cited

U.S. PATENT DOCUMENTS

| | | | |
|---|---|---|---|
| 6,161,124 A * | 12/2000 | Takagawa et al. | 709/203 |
| 7,185,092 B2 * | 2/2007 | Furui et al. | 709/225 |
| 2002/0099602 A1 * | 7/2002 | Moskowitz et al. | 705/14 |
| 2003/0088559 A1 * | 5/2003 | Teranishi | 707/3 |
| 2004/0111432 A1 * | 6/2004 | Adams et al. | 707/104.1 |
| 2007/0061333 A1 * | 3/2007 | Ramer et al. | 707/10 |
| 2007/0185860 A1 * | 8/2007 | Lissack | 707/5 |
| 2007/0244866 A1 * | 10/2007 | Mishkanian et al. | 707/3 |

FOREIGN PATENT DOCUMENTS

| | | |
|---|---|---|
| JP | 2005-071319 A | 3/2005 |
| JP | 2007-034772 A | 2/2007 |
| KR | 10-2001-0070753 A | 7/2001 |
| KR | 10-2001-0091448 A | 10/2001 |

(Continued)

OTHER PUBLICATIONS

English Language Abstract of JP 2005-071319 A.

(Continued)

*Primary Examiner* — Robert Beausoliel, Jr.
*Assistant Examiner* — Michael Pham
(74) *Attorney, Agent, or Firm* — Jacobson Holman Hershkovitz PLLC

(57) ABSTRACT

A total homepage service providing system includes an information provider information administration unit configured to register and administrate information of an information appliance of an information provider and information of the information provider; a homepage generation unit configured to automatically generate a homepage which can be displayed on the information appliance of the information provider and an information appliance of an information user, using metadata received from the information appliance of the information provider; a homepage registration and administration unit configured to store a file of the generated homepage, and register and administrate the homepage; and an index generation and administration unit configured to generate one or more homepage indexes for an information search, using keywords extracted and classified from the generated homepage, and administrate the generated homepage indexes.

36 Claims, 39 Drawing Sheets

(56) References Cited

FOREIGN PATENT DOCUMENTS

| KR | 10-2001-0092922 A | 10/2001 |
|---|---|---|
| KR | 10-2001-0094912 A | 11/2001 |
| KR | 10-2002-0004906 A | 1/2002 |
| KR | 10-2002-0010227 A | 2/2002 |
| KR | 10-2002-0029256 A | 4/2002 |
| KR | 10-2002-0062464 A | 7/2002 |
| KR | 10-2002-0076647 A | 10/2002 |
| KR | 10-2003-0048710 A | 6/2003 |
| KR | 10-2003-0095546 A | 12/2003 |
| KR | 10-2004-0010315 A | 1/2004 |
| KR | 10-2004-0028830 A | 4/2004 |
| KR | 10-2004-0029572 A | 4/2004 |
| KR | 10-2004-0077354 A | 9/2004 |
| KR | 10-0447633 B1 | 9/2004 |
| KR | 10-2005-0016829 A | 2/2005 |
| KR | 10-2005-0068322 A | 7/2005 |
| KR | 10-2005-0100794 A | 10/2005 |
| KR | 10-0523512 B1 | 10/2005 |
| KR | 10-0532711 B1 | 12/2005 |
| KR | 10-2006-0014233 A | 2/2006 |
| KR | 10-2006-0016468 A | 2/2006 |
| KR | 10-2006-0058878 A | 6/2006 |
| KR | 10-2006-0067434 A | 6/2006 |
| KR | 10-2006-0100491 A | 9/2006 |
| KR | 10-0646857 B1 | 11/2006 |
| KR | 10-0653506 B1 | 12/2006 |
| KR | 10-2007-0003418 A | 1/2007 |
| KR | 10-0671077 B1 | 1/2007 |
| KR | 10-0673653 B1 | 1/2007 |
| KR | 10-2007-0019374 A | 2/2007 |
| KR | 10-2007-0038146 A | 4/2007 |
| KR | 10-2007-0058685 A | 6/2007 |
| KR | 10-2007-0079976 A | 8/2007 |
| KR | 10-0770799 B1 | 10/2007 |
| KR | 10-2008-0009391 A | 1/2008 |
| KR | 10-0837076 B1 | 6/2008 |
| KR | 10-0880001 B1 | 1/2009 |
| KR | 10-0904195 B1 | 6/2009 |

OTHER PUBLICATIONS

English Language Abstract of JP 2007-034772 A.
English Language Abstract of KR 10-2001-0070753 A.
English Language Abstract of KR 10-2001-0091448 A.
English Language Abstract of KR 10-2001-0092922 A.
English Language Abstract of KR 10-2001-0094912 A.
English Language Abstract of KR 10-2002-0004906 A.
English Language Abstract of KR 10-2002-0010227 A.
English Language Abstract of KR 10-2002-0029256 A.
English Language Abstract of KR 10-2002-0062464 A.
English Language Abstract of KR 10-2002-0076647 A.
English Language Abstract of KR 10-2003-0048710 A.
English Language Abstract of KR 10-2003-0095546 A.
English Language Abstract of KR 10-2004-0010315 A.
English Language Abstract of KR 10-2004-0028830 A.
English Language Abstract of KR 10-2004-0029572 A.
English Language Abstract of KR 10-2004-0077354 A.
English Language Abstract of KR 10-2005-0016829 A.
English Language Abstract of KR 10-2005-0068322 A.
English Language Abstract of KR 10-2005-0100794 A.
English Language Abstract of KR 10-2006-0014233 A.
English Language Abstract of KR 10-2006-0016468 A.
English Language Abstract of KR 10-2006-0058878 A.
English Language Abstract of KR 10-2006-0067434 A.
English Language Abstract of KR 10-2006-0100491 A.
English Language Abstract of KR 10-2007-0003418 A.
English Language Abstract of KR 10-2007-0019374 A.
English Language Abstract of KR 10-2007-0038146 A.
English Language Abstract of KR 10-2007-0058685 A.
English Language Abstract of KR 10-2007-0079976 A.
English Language Abstract of KR 10-2008-0009391 A.
English Language Abstract of English Language Abstract of KR 10-2001-0074232 A which is the application publication of KR 10-0447633 B1.
English Language Abstract of KR 10-0523512 B1.
English Language Abstract of KR 10-0532711 B1.
English Language Abstract of KR 10-0646857 B1.
English Language Abstract of KR 10-2004-0035589 A which is the application publication of KR 10-0653506 B1.
English Language Abstract of KR 10-2006-0096356 A which is the application publication of KR 10-0671077 B1.
English Language Abstract of KR 10-0673653 B1.
English Language Abstract of KR 10-2007-0037203 A which is the application publication of KR 10-0770799 B1.
English Language Abstract of KR 10-2008-0042487 A which is the application publication of KR 10-0837076 B1.
English Language Abstract of KR 10-0880001 B1.
English Language Abstract of KR 10-2009-0063423 A which is the application publication of KR 10-0904195 B1.
International Search Report of PCT/KR2009/006427 mailed on Jul. 28, 2010.

* cited by examiner

Fig.7
Fig.8

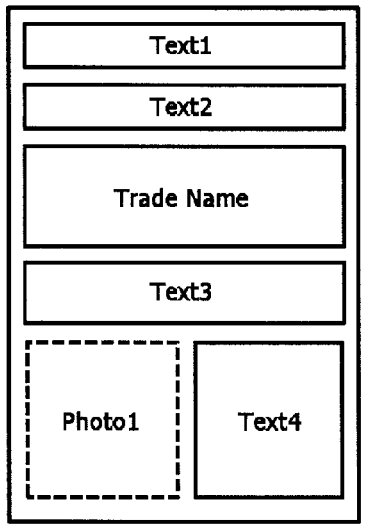

```
<html>
<table width="480" height="800" border="1" cellspacing="10">
  <tr height="70">
    <td colspan="2" align="center">
    Text1
    </td>
  </tr>
  <tr height="70">
    <td colspan="2" align="center">
    Text2
    </td>
  </tr>
  <tr height="240">
    <td colspan="2" align="center">
    Trade Name
    </td>
  </tr>
  <tr height="70">
    <td colspan="2" align="center">
    Text3
    </td>
  </tr>
  <tr height="150">
    <td align="center" width="240">Photo1</td>
    <td align="center" width="240">Text4</td>
  </tr>
</table>
</html>
```

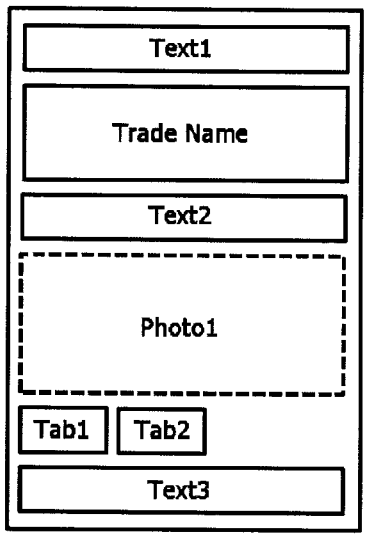

```
< html >
< table width="480" height="800" border="1"
cellspacing="10" >
  < tr height="70" >
    < td colspan="2" align="center" >
      Text1
    </td>
  </tr>
  < tr height="170" >
    < td colspan="2" align="center" >
      Trade Name
    </td>
  </tr>
  < tr height="70" >
    < td colspan="2" align="center" >
      Text2
    </td>
  </tr>
  < tr height="160" >
    < td colspan="2" align="center" >
      Photo1
    </td>
  </tr>
  < tr height="40" >
    < td align="center" width="240" >Tab1</td>
    < td align="center" width="240" >Tab2</td>
  </tr>
  < tr height="90" >
    < td colspan="2" align="center" >
      Text3
    </td>
  </tr>
</table>
</html>
```

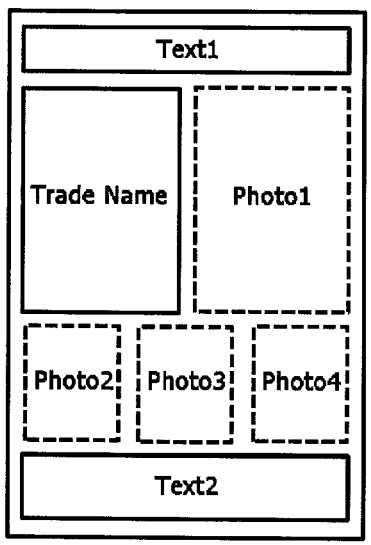

```
< html >
< table width="480" height="800" border="1"
cellspacing="10" cellspacing="10">
  < tr height="70" >
    < td colspan="2" align="center" >
    Text1
    < /td >
  < /tr >
  < tr height="270" >
    < td align="center" width="240" >Trade Name< /td >
    < td align="center" width="240" >Photo1< /td >
  < /tr >
  < tr height="170" >
    < td colspan="2" align="center" >
      < table border="1" width="100%"
height="100%" >
        < tr >
          < td align="center" >Photo2< /td >
          < td align="center" >Photo3< /td >
          < td align="center" >Photo4< /td >
        < /tr >
      < /table >
    < /td >
  < /tr >
  < tr height="90" >
    < td colspan="2" align="center" >
    Text2
    < /td >
  < /tr >
< /table >
< /html >
```

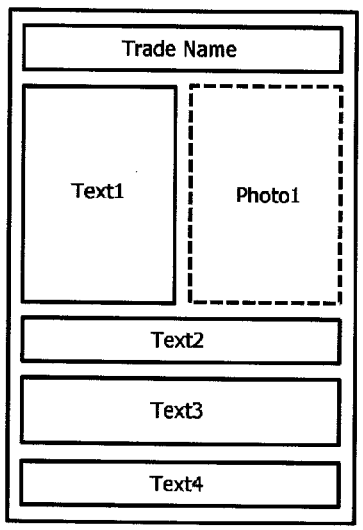

```
<HTML>
<HEAD>
 <TITLE> New Document </TITLE>
 </HEAD>
<BODY>
<TABLE WIDTH="480" HEIGHT="800" BORDER=1
CELLSPACING=10>
 <TR >
   <TD COLSPAN=2 WIDTH="100%" HEIGHT="80"
ALIGN="CENTER">Trade Name</TD>
 </TR>
 <TR >
   <TD WIDTH="50%" ALIGN="CENTER">Text1</TD>
   <TD WIDTH="50%" ALIGN="CENTER">Photo1</TD>
 </TR>
 <TR >
   <TD COLSPAN=2 WIDTH="100%" HEIGHT="100"
ALIGN="CENTER">Text2</TD>
 </TR>
 <TR >
   <TD COLSPAN=2 WIDTH="100%" HEIGHT="130"
ALIGN="CENTER">Text3</TD>
 </TR>
 <TR >
   <TD COLSPAN=2 WIDTH="100%" HEIGHT="100"
ALIGN="CENTER">Text4</TD>
 </TR>
</TABLE>
</BODY>
</HTML>
```

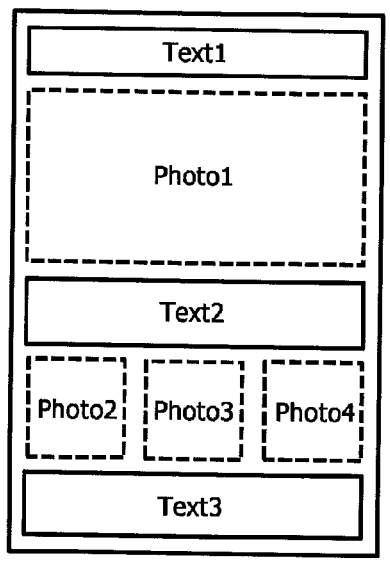

```
<HTML>
<HEAD>
<TITLE> New Document </TITLE>
</HEAD>
<BODY>
  <TABLE WIDTH="480" HEIGHT="800" BORDER=1
CELLSPACING=10>
    <TR>
      <TD COLSPAN=3 WIDTH="100%" HEIGHT="100"
ALIGN="CENTER">Text1</TD>
    </TR>
    <TR>
      <TD COLSPAN=3 WIDTH="100%"
ALIGN="CENTER">Photo1</TD>
    </TR>
    <TR>
      <TD COLSPAN=3 WIDTH="100%" HEIGHT="120"
ALIGN="CENTER">Text2</TD>
    </TR>
    <TR HEIGHT="140">
      <TD WIDTH="33%" ALIGN="CENTER">Photo2</TD>
      <TD WIDTH="33%" ALIGN="CENTER">Photo3</TD>
      <TD WIDTH="33%" ALIGN="CENTER">Photo4</TD>
    </TR>
    <TR>
      <TD COLSPAN=3 WIDTH="100%" HEIGHT="120"
ALIGN="CENTER">Text3</TD>
    </TR>
  </TABLE>
</BODY>
</HTML>
```

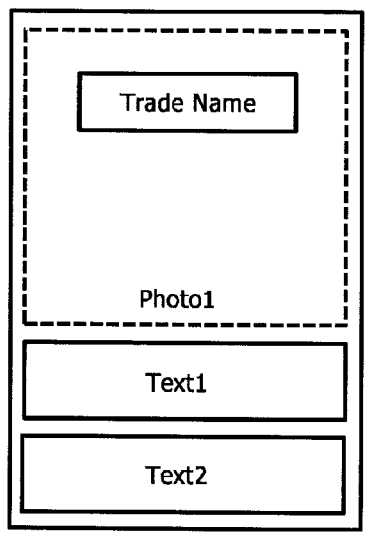

```
<HTML>
<HEAD>
  <TITLE> New Document </TITLE>
</HEAD>
<BODY>
  <TABLE WIDTH="480" HEIGHT="800" BORDER=1 CELLSPACING=10 >
    <TR HEIGHT="450">
      <TD VALIGN="TOP">
        <TABLE CELLSPACING=0 WIDTH="100%">
          <TR >
            <TD COLSPAN=3 HEIGHT=60 > </TD>
          </TR>
          <TR >
            <TD > </TD>
            <TD WIDTH="70%" ALIGN="CENTER" HEIGHT=100 >
              <TABLE WIDTH="100%" HEIGHT="100%" CELLSPACING=0 BORDER=1>
                <TR >
                  <TD ALIGN="CENTER">Trade Name</TD>
                </TR>
              </TABLE>
            </TD>
            <TD > </TD>
          </TR>
        </TABLE>
      </TD>
    </TR>
    <TR >
      <TD WIDTH="100%" ALIGN="CENTER">Text1</TD>
    </TR>
    <TR >
      <TD WIDTH="100%" ALIGN="CENTER">Text2</TD>
    </TR>
  </TABLE>
</BODY>
</HTML>
```

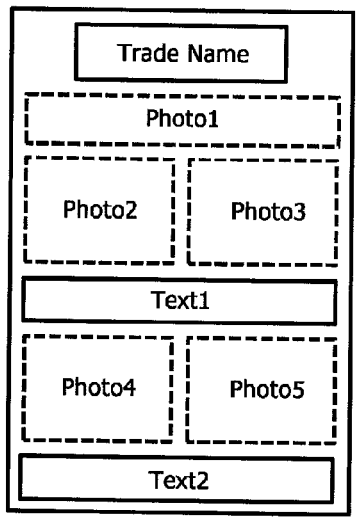

```
<HTML>
<HEAD>
<TITLE> New Document </TITLE>
</HEAD>
<BODY>
<TABLE WIDTH="480" HEIGHT="800" BORDER=1 CELLSPACING=10>
  <TR HEIGHT="110">
    <TD COLSPAN=2>
      <TABLE CELLSPACING=0 WIDTH="100%" HEIGHT="100%">
        <TR>
          <TD> </TD>
          <TD WIDTH="70%" ALIGN="CENTER" HEIGHT="100" WIDTH="100%" ALIGN="CENTER" 100%">
            <TABLE WIDTH="100%" HEIGHT="100%" CELLSPACING=0 BORDER=1>
              <TR>
                <TD ALIGN="CENTER">Trade Name</TD>
              </TR>
            </TABLE>
          </TD>
          <TD> </TD>
        </TR>
      </TABLE>
    </TD>
  </TR>
  <TR>
    <TD WIDTH="100%" ALIGN="CENTER" COLSPAN=2 HEIGHT="90">Photo1</TD>
  </TR>
  <TR>
    <TD WIDTH="50%" ALIGN="CENTER">Photo2</TD>
    <TD WIDTH="50%" ALIGN="CENTER">Photo3</TD>
  </TR>
  <TR>
    <TD WIDTH="100%" ALIGN="CENTER" COLSPAN=2 HEIGHT="90">Text1</TD>
  </TR>
  <TR>
    <TD WIDTH="50%" ALIGN="CENTER">Photo4</TD>
    <TD WIDTH="50%" ALIGN="CENTER">Photo5</TD>
  </TR>
  <TR>
    <TD WIDTH="100%" ALIGN="CENTER" COLSPAN=2 HEIGHT="90">Text2</TD>
  </TR>
</TABLE>
</BODY>
</HTML>
```

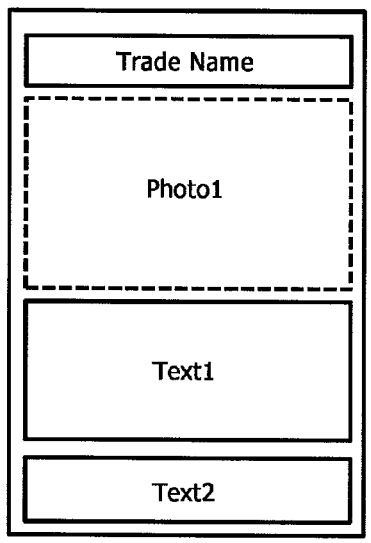

```
<?xml version="1.0" encoding="UTF-8"?>
<!DOCTYPE html PUBLIC "-//W3C//DTD XHTML
1.0 Strict/EN"
"http://www.w3.org/TR/xhtml/DTD/xhtml1-strict.dtd">
<html xmlns="http://www.w3.org/1999/xhtml"
xml:lang="en" lang="en" >
<table width="480" height="800" border="1"
cellspacing="10">
  <tr height="70">
    <td align="center">
      Trade Name
    </td>
  </tr>
  <tr height="280">
    <td align="center">
      Photo1
    </td>
  </tr>
  <tr height="230">
    <td align="center">
      Text1
    </td>
  </tr>  <tr height="50">
    <td align="center">
      Text2
    </td>
  </tr>
</table>
</html>
```

| Homepage No. | Homepage URL | Date of Generation | Date of Correction | Keyword 1 | Keyword 2 | Keyword 3 | User ID | User PW | UA | ... | Homepage File No. |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |

Fig.34

Famous Restaurant Index

| Trade Name | Location | Main Menu | Homepage Storage Location | Date of Update | Address | Phone Number | Reputation (Taste) |
|---|---|---|---|---|---|---|---|
| SE House | YS-dong | Kimchi | 124.137.4.173 | 2009.01.02 | YS-dong 16-1, Seoul | 02-551-4564 | 4 |
| SE House | CS-dong | Rice Bread | 124.137.4.177 | 2009.01.04 | CS-dong 15-4, Seoul | 02-456-7567 | 3 |
| PY House | YM-dong | Mixed Rice | 124.137.4.179 | 2009.01.05 | YM-dong 41, Seoul | 02-994-3633 | 5 |
| PY House | BB-dong | Noodle | 124.137.4.199 | 2009.01.09 | BB-dong 746, Seoul | 02-494-5644 | 5 |
| ...... | ...... | ...... | ...... | ...... | ...... | ...... | ...... |
|  |  |  |  |  |  |  |  |
|  |  |  |  |  |  |  |  |
| ...... | ...... | ...... | ...... | ...... | ...... | ...... | ...... |
|  |  |  |  |  |  |  |  |
|  |  |  |  |  |  |  |  |

Fig.36

Personal Index

| Name | Occupation | Resident Registration Number | Address | Phone Number | Homepage Storage Location | Date of Update |
|---|---|---|---|---|---|---|
| Kim S.R. | Student | 860212-1****** | SR-dong 1121, Seoul | 010-654-4657 | 124.137.6.002 | 2009.04.21 |
| Lee Y. K. | Officer | 711211-1****** | DS-dong 545-4, Seoul | 010-574-4564 | 124.137.6.100 | 2009.04.25 |
| Jeon J. W. | Housewife | 750415-2****** | PT-dong 546-7, Pusan | 010-411-1178 | 124.137.7.051 | 2009.04.26 |
| Park Y. H. | Student | 891102-1****** | SY-Dong 456-7, Cheonan | 010-756-4564 | 124.137.7.052 | 2009.04.27 |
| ⋮ | ⋮ | ⋮ | ⋮ | ⋮ | ⋮ | ⋮ |
| | | | | | | |
| | | | | | | |
| ⋮ | ⋮ | ⋮ | ⋮ | ⋮ | ⋮ | ⋮ |

Fig.37

Service Index

| Service Name | Service Area | Trade Name | Phone Number | Homepage Storage Location | Reputation (Service) | Date of Generation |
|---|---|---|---|---|---|---|
| Chauffeur Service | BP-dong, Seoul | 4u | 02-575-8282 | 124.250.12.1 | 4/5 | 2009.5.2 |
| Chauffeur Service | GY1-dong, Seoul | Star | 02-3662-8484 | 124.250.12.2 | 5/5 | 2009.5.2 |
| Car Sale | GS1-dong, Incheon | Lovecar | 032-523-1244 | 124.250.24.9 | 3/5 | 2009.5.2 |
| ⋮ | ⋮ | ⋮ | ⋮ | ⋮ | ⋮ | 2009.5.2 |
| ⋮ | ⋮ | ⋮ | ⋮ | ⋮ | ⋮ | 2009.5.2 |
| Flower Delivery | DS-dong, Kwangju | Country | 062-951-9994 | 124.279.02.10 | 5/5 | 2009.5.2 |
| Flower Delivery | GP-dong, Seoul | Loveflower | 02-575-9998 | 124.279.02.81 | 5/5 | 2009.5.2 |
| ⋮ | ⋮ | ⋮ | ⋮ | ⋮ | ⋮ | ⋮ |

Fig.38

| Evaluation Factor | Evaluation Adjective | Part of Speech of Evaluation Factor |
|---|---|---|
| Taste | Delicious | Common Noun |
| Service | Good-servicing | Common Noun |
| Atmosphere | Atmospheric | Common Noun |
| Price | Cheap | Common Noun |
| Distance | Near | Common Noun |
| ... ... | ... ... | ... ... |
| ... ... | ... ... | ... ... |
| ... ... | ... ... | ... ... |
| ... ... | ... ... | ... ... |
| ... ... | ... ... | ... ... |

Fig.40

Delicious Food

| Taste Reputation Rank | Date of Generation | Trade Name | Business Category | Location | Homepage Storage Location | Phone Number | Reputation | Evauation Adjective |
|---|---|---|---|---|---|---|---|---|
| 1 | 2009.5.5 | PY House | Mixed Rice | YM-dong, Seoul | 124.280.03.09 | 02-456-4567 | 5/5 | delicious |
| 1 | 2009.5.5 | PY House | Noodle | BB-dong, Seoul | 124.280.03.99 | 02-765-6444 | 5/5 | delicious |
| 2 | 2009.5.5 | ⋯ | ⋯ | ⋯ | ⋯ | ⋯ | ⋯ | delicious |
| 2 | 2009.5.5 | ⋯ | ⋯ | ⋯ | ⋯ | ⋯ | ⋯ | ⋯ |
| ⋯ | ⋯ | ⋯ | ⋯ | ⋯ | ⋯ | ⋯ | ⋯ | ⋯ |

Fig.41

Cheap Oil Station

| Rank | Trade Name | Location | Date of Generation | Price of Gasoline | Price of Diesel Oil | Advertisement | Homepage URL |
|---|---|---|---|---|---|---|---|
| 1 | Hyundai-oil | YS-dong | 09.05.05 | 1,558 | 1,460 | X | www.oilbank.co.kr |
| 2 | S-oil | Bl-dong | 09.05.05 | 1,559 | 1,470 | O | www.s-oil.com |
| 3 | SK | SC2-dong | 09.05.05 | 1,605 | 1,480 | O | www.skenergy.com |
| 4 | GS | Yj-dong | 09.05.05 | 1,610 | 1,495 | O | www.gscaltex.co.kr |
| ...... | ...... | ...... | ...... | ...... | ...... | ...... | ...... |

Fig.42

| Search Word/Phrase | Common Reputation Index Name | Related Index | Index Storage Location |
|---|---|---|---|
| Taste good Bulgogi | Delicious Bulgogi | Famous Restaurant | 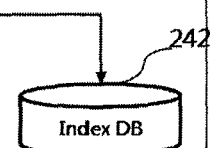 |
| Good Bulgogi | Delicious Bulgogi | Famous Restaurant | |
| Delicious Bulgogi | Delicious Bulgogi | Famous Restaurant | |
| ... ... | ... ... | ... ... | |
| Kind bank | Kind bank | Bank | |
| Good bank | Kind bank | Bank | |
| Cozy bank | Kind bank | Bank | |
| Kindest bank | Kind bank | Bank | |
| ... ... | ... ... | ... ... | |
| Cheap car | Cheap car | Car | |
| Inexpensive car | Cheap car | Car | |
| Reasonable car | Cheap car | Car | |
| Economical car | Cheap car | Car | |
| Free delivery | Free delivery | | |
| Gratis delivery | Free delivery | | |
| ... ... | ... ... | ... ... | |
| Close | Place | | |
| Nearby | Place | | |
| Near | Place | | |
| Close by | Place | | |
| ... ... | ... ... | ... ... | |
| Today | When | | |
| now | When | | |
| ... ... | ... ... | ... ... | |
| YS-dong | Location | | |
| Gangnam Station | Subway Line 2 | | |
| ... ... | ... ... | ... ... | |
| KIM G. D. | Personal | Personal | |
| ... ... | ... ... | ... ... | |
| Wine | Wine | | |
| Medoc | Wine | | |
| ... ... | ... ... | ... ... | |

Fig.44

| Homepage No. | Page View Number | Access Keyword | Access Date & Time | Click Number | Click Rate | Conversion Number | Conversion Rate | Reply Number | Evaluation Quotient |
|---|---|---|---|---|---|---|---|---|---|
| | | | | | | | | | |
| | | | | | | | | | |
| | | | | | | | | | |
| | | | | | | | | | |

SYSTEM AND METHOD FOR PROVIDING TOTAL HOMEPAGE SERVICE

BACKGROUND OF THE INVENTION

1. Field of the Invention

The present invention relates to a system and a method for providing a total homepage service, and more particularly, to a system and a method for providing a total homepage service, which can generate homepages for various information appliances, register generated homepages on a web server, administrate registered homepages, construct a homepage index database by extracting and classifying keywords from the homepages, and arrange a search unit for utilizing the constructed database, thereby providing a homepage-related total service.

2. Description of the Related Art

Recently, as performances of various portable terminals have been improved at a remarkably high speed, portable terminals are developed as multimedia devices which invade the territories of other electronic appliances by overcoming the simple individual functions of a camera, a phone, an MP3 player, and so forth.

In particular, in portable information appliances such as portable phones based on wireless information communication, a situation, which can activate new services based on data contents, is being developed.

Accordingly, technologies for enabling various information services utilizing Internet, provided in the existing desktop computers, notebook computers, etc., to be used in portable information appliances such as portable phones are required.

In detail, in portable information appliances, since not only monitors but also input devices are miniaturized and data transmission speeds and capacities are limited, service utilizing circumstances for the portable information appliances cannot help but be different from those for the existing computers. For this reason, in order to provide the existing information services to such portable information appliances, lifestyle-friendly user interfaces should be provided to the portable information appliances, and web building technologies suitable for the portable information appliances and structural information adaptation technologies are essentially required.

Specifically, a homepage service providing technology for allowing users of portable information appliances, having various knowledge levels, to generate homepages in their portable information appliances, post information which they want to provide, and effectively handle information searches from outsides is required.

Furthermore, without being restricted to the homepage generation-related services as described above, a total homepage service providing technology capable of allowing the users to extract keywords from the homepages generated to be suited for the circumstances of the portable information appliances, construct databases using the extracted keywords, and use the information of the databases through easy searches is required.

That is to say, a homepage-related total service capable of allowing any user of open information appliances to generate homepages suitable for their information appliances without being limited in terms of time and place, easily register, maintain and administrate the generated homepages, access desired homepages through searches, and freely use the information open in the homepages is required.

Various homepage service providing technologies for portable information appliances have been disclosed in the art.

Korean Patent Laid-open Publication No. 2007-0019374 discloses a system and a method for generating a homepage. A large amount of design concepts are built and stored in advance by classifying various designs, to be used in homepages by types and business categories. As a user selects one design from a design list, a homepage can be generated based on the selected design.

Korean Patent Laid-open Publication No. 2001-0070753 discloses a homepage generation system. A user, who wants to generate or change a homepage and has inputted appropriate data, can simply click a desired color or image for a design or a structure which suits the user's taste. Personal information and a design setting value of each user are administrated in a database, and an image is administrated as a record in the database, so that the user can generate a homepage.

Korean Patent Laid-open Publication No. 2004-0028830 discloses a homepage generation method using a table structure. A user can construct a desired homepage on-line through a homepage wizard unit.

Korean Patent Laid-open Publication No. 2003-0095546 discloses a method for constructing a web page and a website using a web module. When constructing a user's desired web page, a design and a function can be changed, added and deleted through realization of a web module. A desired website can be automatically generated through selection of web pages realized using the web module.

Korean Patent Laid-open Publication No. 2002-0076647 discloses a method for automatically generating and administrating a homepage based on a metalanguage. A homepage can be generated to have a meta-structure, and a homepage which has already been constructed can be converted into a homepage having a meta-structure.

Korean Patent Laid-open Publication No. 2006-0014233 discloses a method for automatically creating a web design. A web design can be automatically created based on inputted data, by using a web design automatic creation system which has a web design work tool built therein.

Korean Patent Laid-open Publication No. 2006-0100491 discloses a method for automatically generating and administrating a layout and contents when constructing a website. In administration of a website, a layout can be automatically generated, and a menu can be changed and corrected in conformity with the circumstances of users by modules.

Korean Patent Laid-open Publication No. 2001-0094912 discloses a system and a method for generating and operating a mobile homepage. A user's selection and the contents inputted by the user are stored. When the stored contents are paged through a portable terminal, the contents are displayed by being converted to conform to using circumstances of the portable terminal which has implemented the paging. As a result, a mobile homepage can be easily constructed.

Korean Patent Laid-open Publication No. 2002-0010227 discloses a method for constructing a wireless Internet phone page. A user inputs phone page registration contents, and the inputted contents are transmitted to a web server through Internet connection. A phone page can be easily generated, corrected and edited using a mobile phone.

Korean Patent Laid-open Publication No. 2002-0029256 discloses a method for providing a web construction service using a mobile communication system. Data inputted to a web item is received from a user's mobile communication terminal, and a source code is generated using the received data, whereby a homepage can be quickly generated.

Korean Patent Laid-open Publication No. 2002-0004906 discloses a personal intranet service system and a method for managing a phone page using the same. A permanent address of an Internet mobile phone and an Internet homepage is assigned to a user through a phone number, and various information on a network can be open to homepages, so that information exchange between a consumer and a supplier can be enabled, whereby the quality and reliability of a product can be improved.

Korean Patent Laid-open Publication No. 2003-0048710 discloses a method for editing a phone page in a mobile communication terminal. A phone page can be edited off-line so that costs incurred due to on-line connection when conducting edition can be saved.

Korean Patent No. 447633 discloses a method and a system for authoring wireless contents/site. When authoring and constructing wireless contents or a wireless Internet site, users can easily author and construct the wireless contents or the wireless Internet site under WYSIWYG circumstances even without knowledge for a wireless Internet markup language.

Korean Patent Laid-open Publication No. 2004-0077354 discloses a homepage editor using a mobile terminal. An editor, which has functions for editing/confirming a simple homepage and transmitting a file, is provided to a mobile terminal so that upload to a homepage server can be performed, whereby a mobile homepage can be edited through a mobile terminal.

Korean Patent Laid-open Publication No. 2005-0016829 discloses a method for building a homepage using a mobile communication terminal. A homepage is constructed through a template page, and a homepage can be updated using a message transmitted from a mobile communication terminal.

Korean Patent Laid-open Publication No. 2005-0068322 discloses a method for constructing a phone page using a VM (virtual machine) or a WIPI (wireless Internet platform for interoperability). A homepage and a phone page which can be easily linked by a person can be constructed on a web.

Korean Patent Laid-open Publication No. 2005-0100794 discloses a method for providing a mobile communication terminal with personal homepage information and a system thereof. The information recorded in a personal homepage database is updated by receiving the information stored in a database of a personal homepage web server, and the updated information can be outputted through an output unit of a mobile communication terminal.

Korean Patent Laid-open Publication No. 2006-0058878 discloses a method for providing a phone page in a portable terminal. A homepage can be edited using a homepage editor which is stored in the memory of a portable terminal, and the homepage can be linked with a web server through the wireless Internet.

Korean Patent Laid-open Publication No. 2006-0067434 discloses a homepage conversion system for a mobile phone and a method thereof. An existing site can be constructed to be linked with a mobile site, whereby it is possible to construct a homepage which can be used in wireless and wired manners.

Korean Patent Laid-open Publication No. 2007-0003418 discloses a method and a device for providing a mobile web page using a dynamic template. The attributes of a template are dynamically administrated, and various UIs (user interfaces) can be provided using one template.

Korean Patent No. 837076 discloses a system and a method for providing a skin in a mobile homepage. A skin list is provided to a user on a mobile homepage so that the user can apply and purchase a desired skin.

Korean Patent No. 532711 discloses a system and a method for providing a data skin based on a standard schema. A data skin based on a standard schema, which allows an XSD (XML schema definition)-based XML document to be viewed at various viewpoints under web circumstances, can be provided.

Korean Patent No. 770799 discloses a system and a method for an automatic homepage making service. Homepage databases by business categories are constructed for various business categories, and homepages can be automatically generated using the data stored in the homepage databases depending upon inputted user information.

Korean Patent No. 523512 discloses a method and a program recording medium for creating, editing and trading homepage components to assemble a homepage and a personal portal site directly in WYSIWYG on a web browser. A homepage can be constructed using HTML codes of components which are built in advance by a professional designer, and a user can directly edit a homepage in WYSIWYG on a web browser.

Korean Patent Laid-open Publication No. 2007-0058685 discloses a method of presenting search results based on a document structure. The method includes the step of discerning a document related with a search term, including a plurality of structural elements; determining a distribution of occurrence of the search term in the document; discerning one of the structural elements based on the distribution of occurrence of the search term in the document; and displaying information related with the discerned structural element.

Korean Patent Laid-open Publication No. 2007-0079976 discloses a system and a method for providing a mobile Internet board. Without the need of constructing a mobile server and a phone page, an Internet board contents provider can perform a mobile contents providing service through a mobile communication terminal.

Korean Patent Laid-open Publication No. 2008-0009391 discloses a device and a method for providing a homepage service in a portable terminal. A web server is provided in a portable terminal such that a web page and contents can be directly transmitted to an outside. Therefore, a personal homepage can be administrated through the portable terminal without using an external server.

Korean Patent Laid-open Publication No. 2006-0016468 discloses a method and a system for providing a search service using the Internet. When conducting a search, a search service provider determines in advance sub-keywords of each keyword. Search results are provided to a user by being classified by the sub-keywords.

Korean Patent Laid-open Publication No. 2004-0010315 discloses an index structure of metadata, a method for providing an index of the metadata, and a metadata searching method and a metadata searching device using the index of the metadata. An index structure of metadata, which can be advantageously used in composite condition searches for information regarding contents, can be provided.

Korean Patent No. 653506 discloses a system for providing information converted in response to a search request. In a network system including a customer computer with a user display and at least one network server with an edition server and original contents, output data can be provided based on the data collected from the network server in response to a search request from a customer.

Korean Patent Laid-open Publication No. 2004-0029572 discloses a method for conducting an information search using a search pad on the Internet. An information search can be conducted on the Internet through a search pad which indexes search categories in a consecutive number type. The number of a corresponding category is stored in a specified variable at a user side. When the contents in the category are searched, a corresponding number is transmitted to a search server, and the search server finds a database which is indexed to the corresponding number and conducts a search in the database. As a consequence, an administration service due to addition and deletion of categories can be removed.

Korean Patent No. 646857 discloses a lookup table construction and an index searching method. A lookup table, which uses a minimum memory due to symmetry of a sine function and a cosine function, is constructed, and the size of the lookup table is reflected on the gain of a DCO (digital controlled oscillator) such that the output value of the DCO itself can be an index of the lookup table. Thus, the index of the lookup table can be searched.

Korean Patent Laid-open Publication No. 2002-0062464 discloses a method for conducting an information search using a metasearch engine and a metasearch engine system. A web page, which has high relevance to a user, can be preferentially outputted in consideration of personal features such as the occupation, age, concern, etc. of the user.

Korean Patent Laid-open Publication No. 2007-0038146 discloses personalization of placed content ordering in search results. A user's profile, which is based on the user's search inquiry, user's reaction for a document confirmed by a search engine and user's personal information, is employed, and search result placement is ordered according to the user's profile.

Korean Patent No. 904195 discloses a system and a method for conducting an information search by using a pre-search of a web document and processing of data and search terms. A pre-search for a web document is conducted, and data, in which only a text is included, or data, in which metadata is included, is processed in advance and stored. A search term which is inputted is processed according to a user's search condition setting so that an optimum search result desired by the user can be provided.

Korean Patent No. 880001 discloses a mobile device for managing personal life and a method for conducting an information search using the mobile device. Personalized information of a user can be searched based on information collected through a mobile device in response to the user's inquiry.

Korean Patent No. 671077 discloses a server, a method and a system for providing an information search service by using a sheaf of pages. When searching information on the Internet, in order to search information most corresponding to desired information, a plurality of web pages which include similar information are collectively indexed, and a search is conducted by the unit of a sheaf of web pages.

Korean Patent No. 673653 discloses a metadata searching method. Metadata is provided as a standard of a search so that a user can conveniently and quickly search music files.

However, the above-described conventional arts are limited to homepage generating, editing and searching technologies which are simply applied to portable appliances or mobile appliances, and fail to disclose technologies for generating a homepage by utilizing metadata in a portable information appliance, registering the generated homepage on a dedicated web server, maintaining and administrating the registered homepage, and providing a web structure and contents information to handle various searches from outsides.

Also, the above-described conventional arts fail to disclose technologies for extracting and classifying keywords from the homepages for the portable information appliances, constructing a homepage index database, and through this, providing various search services.

Further, the development of technologies for providing the above-described total homepage service based on web information of the Internet, not only to the portable information appliances but also for the circumstances of new information appliances including an IPTV (Internet protocol television) which is rapidly distributed these days is keenly demanded in the art.

SUMMARY OF THE INVENTION

Accordingly, the present invention has been made in an effort to solve the problems occurring in the related art, and an object of the present invention is to provide a system and a method for providing a total homepage service, which can generate a homepage for an information appliance by utilizing metadata, register the generated homepage on a web server, and maintain and administrate the registered homepage.

Another object of the present invention is to provide a system and a method for providing a total homepage service, which can construct a homepage index database for information searches by extracting and classifying keywords from metadata-based homepages for information appliances, and arrange a homepage search unit for utilizing the constructed database, thereby providing a homepage-related total service to the information appliances.

Another object of the present invention is to provide a system and a method for providing a total homepage service, which can provide various supplementary services to users through homepage use history information, etc.

In order to achieve the above objects, according to one aspect of the present invention, there is provided a total homepage service providing system for providing homepage-related services in an incorporated manner to information appliances through network communication, the information appliances including an information appliance for an information provider, an information appliance for an information user and an information appliance for an information evaluator, the system including: an information provider information administration unit configured to register and administrate information of the information appliance of the information provider and information of the information provider who uses the information appliance of the information provider; a homepage generation unit configured to automatically generate a homepage which can be displayed on the information appliance of the information provider and the information appliance of the information user, using metadata received from the information appliance of the information provider; a homepage registration and administration unit configured to store a file of the generated homepage, and register and administrate the homepage; and an index generation and administration unit configured to generate one or more homepage indexes for an information search, using keywords extracted and classified from the generated homepage, and administrate the generated homepage indexes.

According to another aspect of the present invention, the total homepage service providing system further includes: a homepage search unit configured to conduct searches for homepages which are registered in the homepage registration and administration unit.

According to another aspect of the present invention, the information provider information administration unit includes: an information provider information administration database configured to store a metadata frame for registration of an information provider; and an information provider information administration section configured to read out the metadata frame for registration of an information provider, transmit the metadata frame to the information appliance of the information provider, store metadata for registration of an information provider, received from the information appliance of the information provider in correspondence to the metadata frame for registration of an information provider, in the information provider information administration database, and extract a homepage generation purpose of the information provider, from the metadata for registration of an information provider.

According to another aspect of the present invention, the homepage generation unit includes: a homepage generation database configured to store a plurality of homepage samples, a plurality of layout frames and a plurality of metadata frames for layout input, the plurality of layout frames and the plurality of metadata frames for layout input corresponding to the plurality of homepage samples, respectively; and a homepage generation unit configured to extract at least one homepage sample conforming to the homepage generation purpose of the information provider among the plurality of homepage samples, transmit the extracted homepage sample to the information appliance of the information provider, read out a layout frame and a metadata frame for layout input corresponding to a homepage sample selected by the information provider among the plurality of layout frames and the plurality of metadata frames for layout input, transmit the layout frame and the metadata frame for layout input to the information appliance of the information provider, generate a homepage layout file using metadata for layout input received from the information appliance of the information provider to be recorded in the homepage, and generate the homepage using the generated homepage layout file.

According to another aspect of the present invention, the homepage layout file is generated using any one of HTML, XML, XHTML, PHP, JAVA, Flash and FLEX script languages.

According to another aspect of the present invention, the homepage registration and administration unit includes: a homepage file storage database configured to store the generated homepage layout file; a homepage registration server configured to register the generated homepage; and a homepage registration section configured to assign a URL to the homepage, extract information regarding the homepage from the homepage layout file, and register the URL of the homepage and the extracted information regarding the homepage in the homepage registration server.

According to another aspect of the present invention, the index generation and administration unit includes: a homepage index generation section configured to extract keywords from the metadata for registration of an information provider stored in the information provider information administration database or from the homepage layout file stored in the homepage file storage database, classify the information of the homepage registered in the homepage registration server by the keywords, and generate the homepage indexes; and a homepage index database configured to store the generated homepage indexes and administrate the stored homepage indexes.

According to another aspect of the present invention, the homepage index generation section builds an evaluation term dictionary by extracting evaluation terms from evaluation information received from the information appliance of the information evaluator and registered in the homepage, generates reputation indexes using the built evaluation term dictionary, and stores the generated reputation indexes in the homepage index database.

According to another aspect of the present invention, the reputation indexes are generated using reputations that are automatically collected through a reputation data collection crawler based on information of the homepage index database.

According to another aspect of the present invention, the keywords are automatically extracted through a crawler.

According to another aspect of the present invention, the homepage file storage database and the homepage registration server can be formed to be incorporated with each other.

According to another aspect of the present invention, the homepage registration section corrects, updates and administrates information regarding homepages which are stored in the homepage registration server.

According to another aspect of the present invention, the metadata frames for layout input can be formed to be incorporated into the layout frames.

According to another aspect of the present invention, the homepage search unit includes: a search term dictionary having search terms stored therein; and a homepage search section configured to conduct searches for the homepages registered in the homepage registration and administration unit by using the search term dictionary in response to requests from the information appliances or an outside.

According to another aspect of the present invention, the search terms can be produced in a single word type or a combination of at least two words, and can have compositions of "Location+Keyword" or "Adjective+Keyword".

According to another aspect of the present invention, the total homepage service providing system further includes: a homepage access history information generation and administration unit including a homepage access history information generation section configured to generate homepage access history information, and a homepage access history information database configured to store the generated homepage access history information.

According to another aspect of the present invention, the generated homepage access history information corresponds to access history information of the information appliances for the homepages registered in the homepage registration and administration unit.

According to another aspect of the present invention, the total homepage service providing system further includes: a supplementary service providing unit configured to provide supplementary services to the information appliances.

According to another aspect of the present invention, the supplementary services include at least any one of advertisement, coupon affording, discount ticket affording, and point affording.

According to another aspect of the present invention, the supplementary service providing unit is linked with global positioning system modules which are mounted to the information appliances, and provides the supplementary services in correspondence to positions of the information appliances.

In order to achieve the above objects, according to another aspect of the present invention, there is provided a total homepage service providing method for providing homepage-related services in an incorporated manner to information appliances through network communication, the information appliances including an information appliance for an information provider, an information appliance for an information user and an information appliance for an information evaluator, the method including: an information provider registering step of registering information of the information appliance of the information provider and information of the information provider who uses the information appliance of the information provider; a homepage generating step of automatically generating a homepage which can be displayed on the information appliance of the information provider and the information appliance of the information user, using metadata received from the information appliance of the information provider; a homepage registering step of storing a file of the generated homepage in a homepage file storage database and registering the homepage in a homepage registration server; a keyword extracting and classifying step of extracting keywords from the generated homepage and classifying the extracted keywords; and an index generating step of generating at least one homepage index for information searches, using the keywords.

According to another aspect of the present invention, the total homepage service providing method further includes: a search conducting step of conducting a search for homepages registered in the homepage registration server.

According to another aspect of the present invention, the information provider registering step includes the steps of transmitting a metadata frame for registration of an information provider to the information appliance of the information provider; storing metadata for registration of an information provider, received from the information appliance of the information provider in correspondence to the metadata frame for registration of an information provider, in an information provider information administration database; and extracting a homepage generation purpose of the information provider from the metadata for registration of an information provider.

According to another aspect of the present invention, the homepage generating step includes the steps of: extracting one or more homepage samples, conforming to the extracted homepage generation purpose of the information provider, from a homepage generation database and transmitting the extracted homepage samples to the information appliance of the information provider; reading out a layout frame and a metadata frame for layout input, which correspond to a homepage sample selected by the information provider among the transmitted homepage samples, from the homepage generation database, and transmitting the layout frame and the metadata frame for layout input to the information appliance of the information provider; generating a homepage layout file using metadata for layout input, received from the information appliance of the information provider in correspondence to the transmitted metadata frame for layout input; and generating the homepage using the generated homepage layout file.

According to another aspect of the present invention, the metadata frame for registration of an information provider includes a homepage sample for each homepage generation purpose, and a layout frame and a metadata frame for layout input, which correspond to the homepage sample.

According to another aspect of the present invention, the homepage registering step includes the steps of: storing the generated homepage layout file in the homepage file storage database; assigning a URL to the generated homepage; and extracting information regarding the homepage from the generated homepage layout file, and register the URL of the homepage and the extracted information regarding the homepage in the homepage registration server.

According to another aspect of the present invention, the URL can be assigned by being numericalized through identification numbers which are assigned to respective domain names and/or classifications.

According to another aspect of the present invention, the total homepage service providing method further includes the step of: correcting, updating or administrating the information for the homepage stored in the homepage registration server.

According to another aspect of the present invention, the index generating step includes the steps of: extracting keywords from the metadata for registration of an information provider stored in the information provider information administration database or from the homepage layout file stored in the homepage file storage database, and classifying the extracted keywords; generating the homepage index by classifying information of homepages registered in the homepage registration server by the extracted keywords; and storing the generated homepage index in a homepage index database.

According to another aspect of the present invention, the total homepage service providing method further includes the step of: administrating homepage indexes stored in the homepage index database.

According to another aspect of the present invention, the homepage indexes include a reputation index, and the index generating step includes the steps of: accessing the homepages registered in the homepage registration server, and searching evaluation factors from evaluation pages of the accessed homepages by referring to an evaluation term dictionary; sorting the homepages by the evaluation factors, using the searched evaluation factors and evaluation values for the searched evaluation factors; and generating the reputation index using sort information.

According to another aspect of the present invention, the search conducting step includes the steps of: checking if there is a homepage index in which a search term received from the information appliance is used as an index name, among the homepage indexes; and extracting the corresponding homepage index and transmitting the extracted homepage index to the information appliance as a search result when it is checked that a homepage index in which a search term received from the information appliance is used as an index name exists.

According to another aspect of the present invention, the search conducting step further includes the step of generating a search result by referring to at least any one of the homepage file storage database, the homepage registration server and the homepage index database and transmitting the generated search result to the information appliance when it is checked that a homepage index in which a search term received from the information appliance is used as an index name does not exist.

According to another aspect of the present invention, the total homepage service providing method further includes the step of: acquiring homepage access history information of the information appliances for the homepages registered in the homepage registration server.

According to another aspect of the present invention, the acquired homepage access history information is stored in a homepage access history information database and is provided to the information appliances upon requests from the information appliances.

According to another aspect of the present invention, the total homepage service providing method further includes the step of: providing at least any one supplementary service among advertisement, coupon affording, discount ticket affording, and point affording.

As is apparent from the above description, according to the present invention, it is possible to provide a homepage-related total service to information appliances in the field of an information appliance web service technology for a mobile web or an IPTV web, which is highlighted as a promising next-generation technical service.

In detail, the following advantages are provided according to the present invention.

1. An information provider, a small business owner, or a person, who does not have any knowledge necessary for the generation and the management of a homepage, can automatically generate a homepage in conformity with his or her homepage generation purpose using metadata irrespective of the kind of an information appliance.

2. The homepage for the information provider, which is automatically generated, can be registered on a web server without introducing a separate server and can be administrated in trust.

3. Due to the fact that a homepage index DB having a table structure is constructed by extracting and classifying keywords from homepages generated for information appliances, a search result can be efficiently and quickly provided in response to a search, from an inside or an outside of a system, for the information registered on the homepages.

4. By building reputation indexes based on evaluation information from users, a lifestyle-friendly search result can be provided in response to a search for reputation.

5. By acquiring homepage access history information and providing it to users, efficient homepage management is enabled.

6. By providing various user-personalized supplementary services to users, the use of homepages can be activated.

BRIEF DESCRIPTION OF THE DRAWINGS

The above objects, and other features and advantages of the present invention will become more apparent after a reading of the following detailed description taken in conjunction with the drawings, in which:

FIGS. 5 through 10 are views showing examples of homepage samples presented to an information provider when a homepage generation purpose corresponds to a "Restaurant";

FIGS. 13 (a) and (b) through FIGS. 21 (a) and (b) are views illustrating examples of layout frames and homepage layout files, respectively;

FIG. 34 is a view illustrating an example of a DB structure of a homepage registration server;

FIGS. 36 through 38 are views illustrating examples of configuring homepage information by indexes;

FIG. 40 is a view illustrating an example of an evaluation term dictionary;

FIGS. 41 and 42 are views illustrating examples of reputation indexes;

FIG. 44 is a view illustrating an example of a search term dictionary;

DETAILED DESCRIPTION OF PREFERRED EMBODIMENTS

Figure 1:
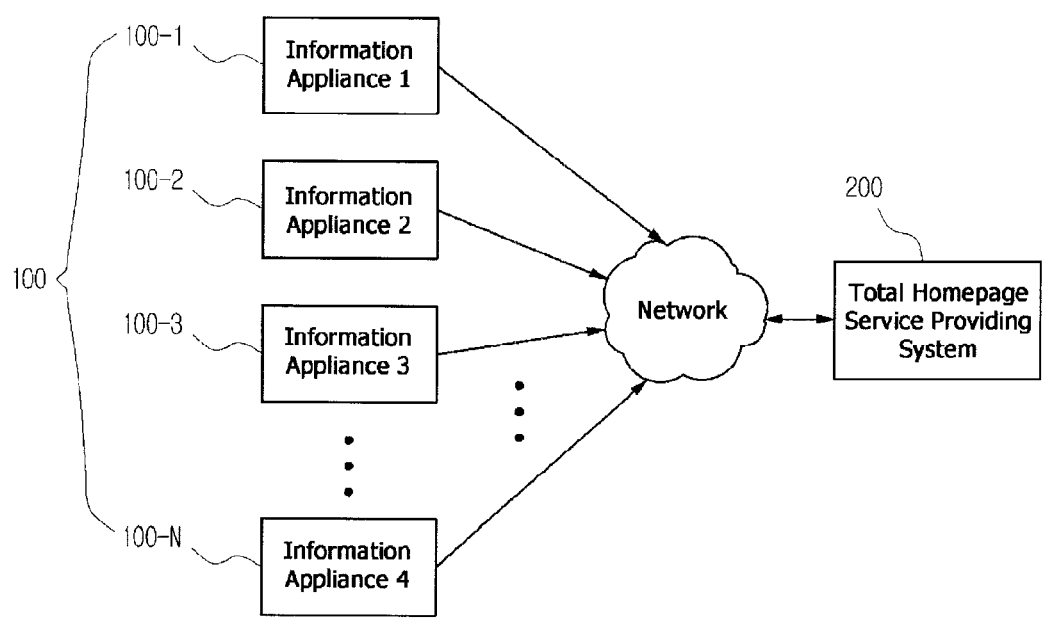
FIG. 1 is a diagram illustrating a service providing flow using a total homepage service providing system in accordance with an embodiment of the present invention.

Reference will now be made in greater detail to preferred embodiments of the invention, examples of which are illustrated in the accompanying drawings. Wherever possible, the same reference numerals will be used throughout the drawings and the description to refer to the same or like parts.

It is to be understood that the terms or words used in this description and the following claims must not be construed to have meanings which are general or found in a dictionary. Therefore, considering the notion that an inventor can most properly define the concepts of the terms or words to best explain his or her invention, the terms or words must be understood as having meanings or concepts that conform to the technical spirit of the present invention. Accordingly, since the present description and the drawings are nothing but the illustration of preferred embodiments of the present invention and do not completely represent the technical concepts of the present invention, it is to be noted that various equivalents and modifications can be made at the time of the present application.

FIG. 1 is a diagram schematically illustrating a service providing flow using a total homepage service providing system in accordance with an embodiment of the present invention.

Referring to FIG. 1, a total homepage service providing system 200 is connected with information appliances 100: 100-1, 100-2, 100-3, . . . , 100-N through a network, and is configured to provide total homepage services to the information appliances 100.

A total homepage service means that homepage-related services, including the generation, registration, maintenance and administration of a homepage, an information search, and so forth, are totally provided in an incorporated manner.

The information appliances 100 mean appliances which are used by users use to provide homepage-related total services from the total homepage service providing system 200 according to the present invention. Any appliance can be used as the information appliances 100 regardless of whether they are portable or not, so long as they can access the total homepage service providing system 200 through a network.

For example, as the information appliances 100, portable appliances such as portable phones, PDAs, netbooks, laptop computers, navigators, PMPs, MP3 players, and so on, and various other appliances such as desktop computers, IPTVs, and so on can be used.

Further, in the present invention, any network connection scheme can be used so long as the information appliances 100 and the total homepage service providing system 200 can transmit and receive data to and from each other. Thus, a network connection scheme and a communication protocol thereof are not specifically limited. Accordingly, the information appliances 100 and the total homepage service providing system 200 can be connected to the network in various ways including wired and wireless types.

In the embodiment of the present invention, for the sake of convenience in explanation, users who use the total homepage service providing system 200 according to the present invention are divided into an information provider, an information user, and an information evaluator. In the present specification, the "information provider" means a user who wants to generate a homepage for himself or herself and provide information to other users through the generated homepage, and the "information user" means a user who collects, acquires and uses information from the homepage of the information provider. Also, the "information evaluator" means a user who evaluates the information provided on the homepage, or goods, services, etc. provided on the homepage on-line or off-line.

Hereafter, the total homepage service providing system 200 in accordance with the embodiment of the present invention shown in FIG. 1 will be described in detail.

Figure 2:
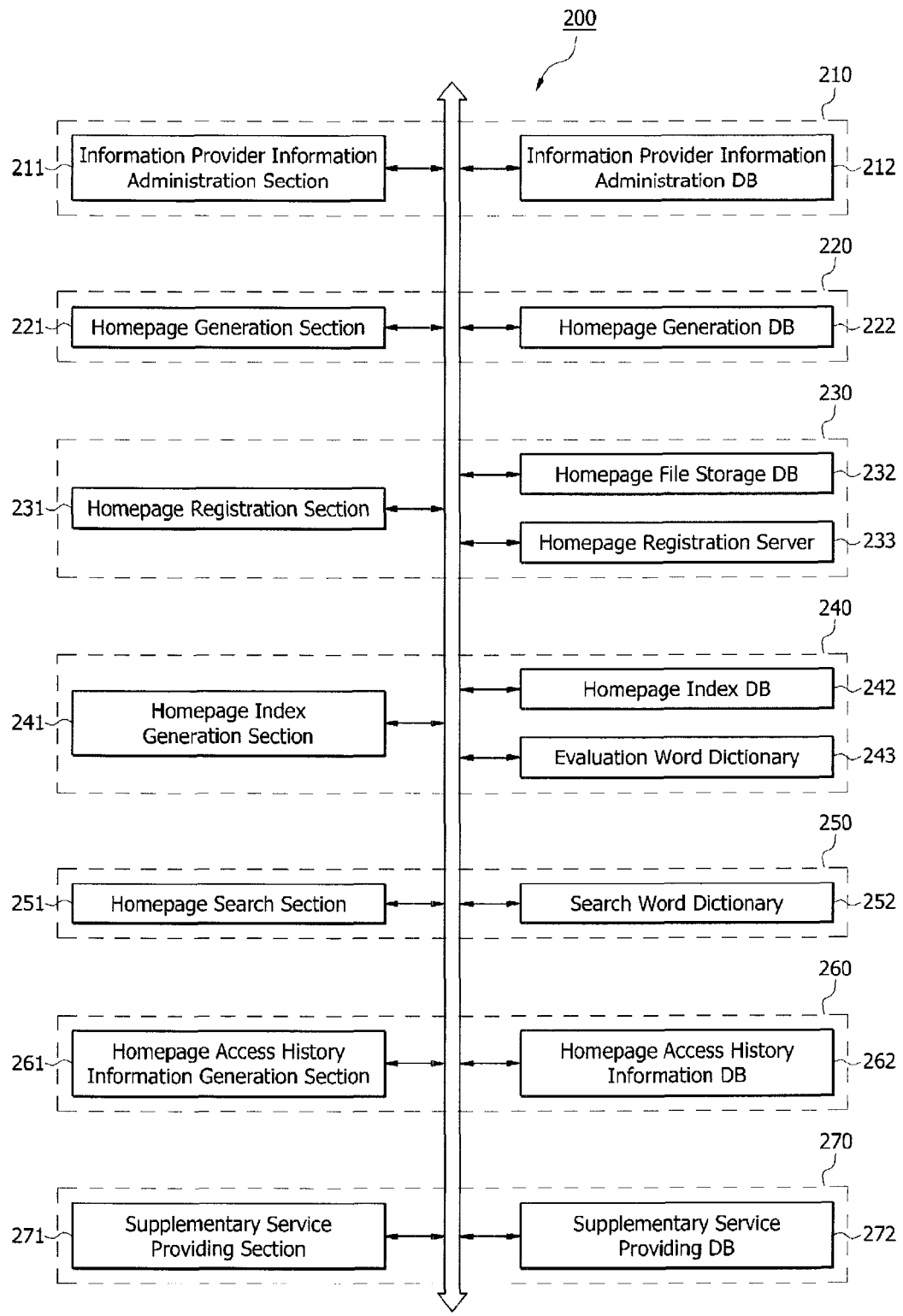
FIG. 2 is a block diagram illustrating the total homepage service providing system in accordance with the embodiment of the present invention.

FIG. 2 is a block diagram illustrating the total homepage service providing system 200 in accordance with the embodiment of the present invention.

Referring to FIG. 2, the total homepage service providing system 200 includes an information provider information administration unit 210, a homepage generation unit 220, a homepage registration and administration unit 230, and an index generation and administration unit 240.

In detail, the information provider information administration unit 210 includes an information provider information administration section 211 and an information provider information administration database (DB) 212, and the homepage generation unit 220 includes a homepage generation section 221 and a homepage generation DB 222. The homepage registration and administration unit 230 includes a homepage registration section 231, a homepage file storage DB 232 and a homepage registration server 233, and the index generation and administration unit 240 includes a homepage index generation section 241 and a homepage index DB 242.

The information provider information administration section 211 is configured to register an information provider who wants to generate and own a homepage, in the information provider information administration DB 212 and administrate the registered information provider.

The homepage generation section 221 is configured to generate a homepage layout file using the information stored in the homepage generation DB 222 and store the generated homepage layout file in the homepage file storage DB 232. The homepage registration section 231 is configured to register the homepage generated by the homepage generation section 221, in the homepage registration server 233 as an internal web server.

The homepage index generation section 241 is configured to generate homepage indexes for information search services, using the keywords employed in the process of generating homepages, and store the generated homepage indexes in the homepage index DB 242. The homepage index DB 242 administrates the homepage indexes stored therein.

In another embodiment, the total homepage service providing system 200 according to the present invention can further include a homepage search unit 250.

The homepage search unit 250 includes a homepage search section 251 and a search term dictionary 252. The homepage search section 251 is configured to conduct a homepage search using the search term dictionary 252.

Meanwhile, the homepage index generation section 241 builds an evaluation term dictionary 243 by extracting evaluation terms from the evaluation information inputted and registered in homepages by information evaluators, generates reputation indexes using the evaluation term dictionary 243, and stores the generated reputation indexes in the homepage index DB 242.

In another embodiment of the present invention, the total homepage service providing system 200 can further include a homepage access history information generation and administration unit 260 and a supplementary service providing unit 270.

The homepage access history information generation and administration unit 260 includes a homepage access history information generation section 261 and a homepage access history information DB 262. The homepage access history information generation and administration unit 260 is configured to generate information which is related with homepage access histories, and store the generated information in the homepage access history information DB 262. The supplementary service providing unit 270 includes a supplementary service providing section 271 and a supplementary service providing DB 272. The supplementary service providing unit 270 is configured to provide various supplementary services to a user, such as providing homepage information in correspondence to the user's position information, affording a coupon, a discount ticket, points, and so forth.

Figure 3:
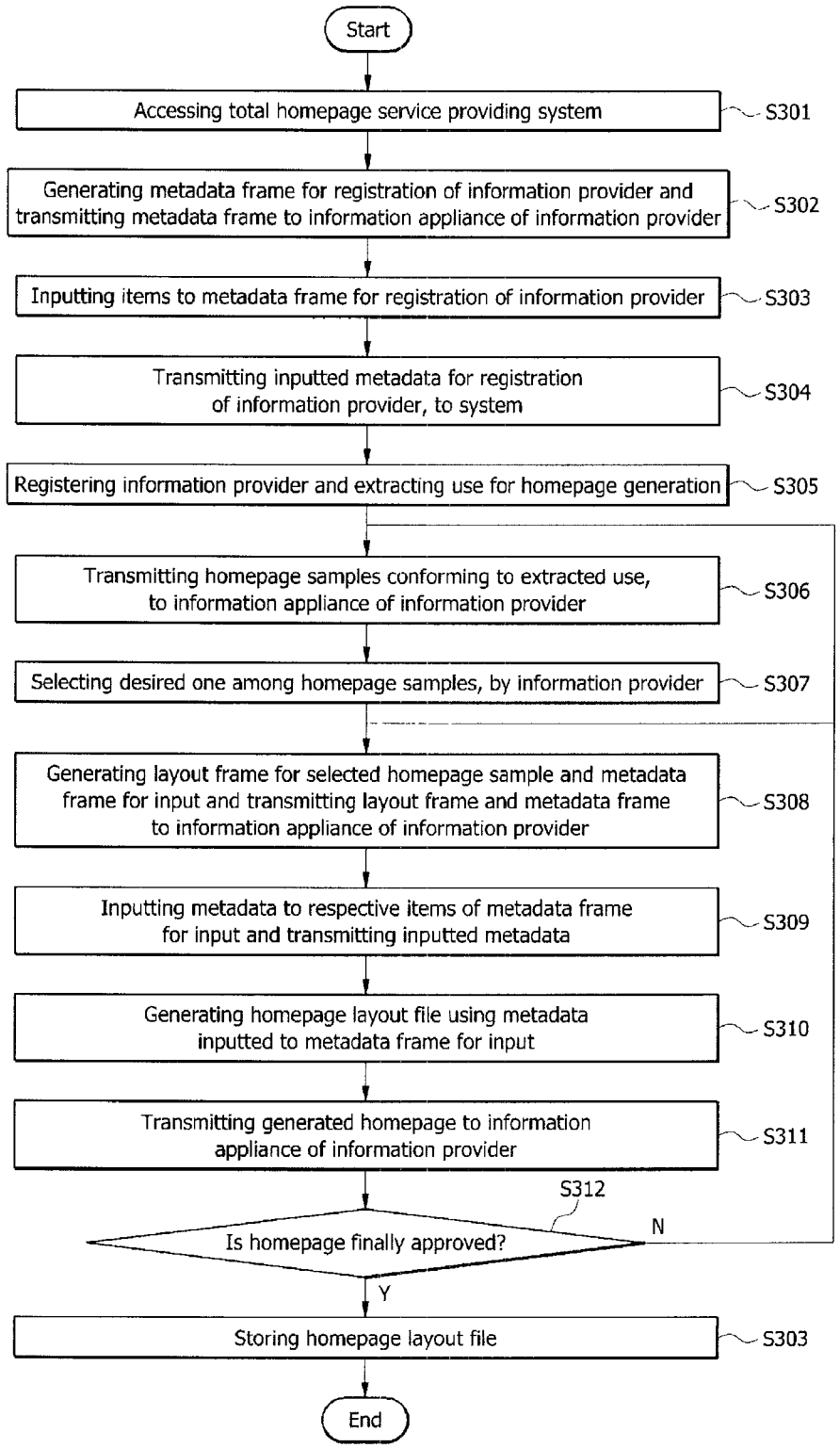
FIG. 3 is a flow chart illustrating a homepage generation service providing method in accordance with another embodiment of the present invention.

FIG. 3 is a flow chart illustrating a homepage generation service providing method using the total homepage service providing system 200 configured as described above.

A homepage generation service providing method will be described with reference to FIG. 3. In the course of describing the homepage generation service providing method, other drawings will be additionally referred to so as to facilitate easy understanding of the present invention.

First, in order to generate a homepage, an information provider accesses a web page which is provided by the total homepage service providing system 200, and starts to generate the homepage (S301). As described above, the information provider can access the total homepage service providing system 200 through the various portable or fixed type information appliances 100.

The information provider information administration section 211 reads out a metadata frame for registration of an information provider, which is stored in the information provider information administration DB 212, and transmits the metadata frame to the information appliance 100 of the information provider who accesses the total homepage service providing system 200 (S302).

Figure 4:
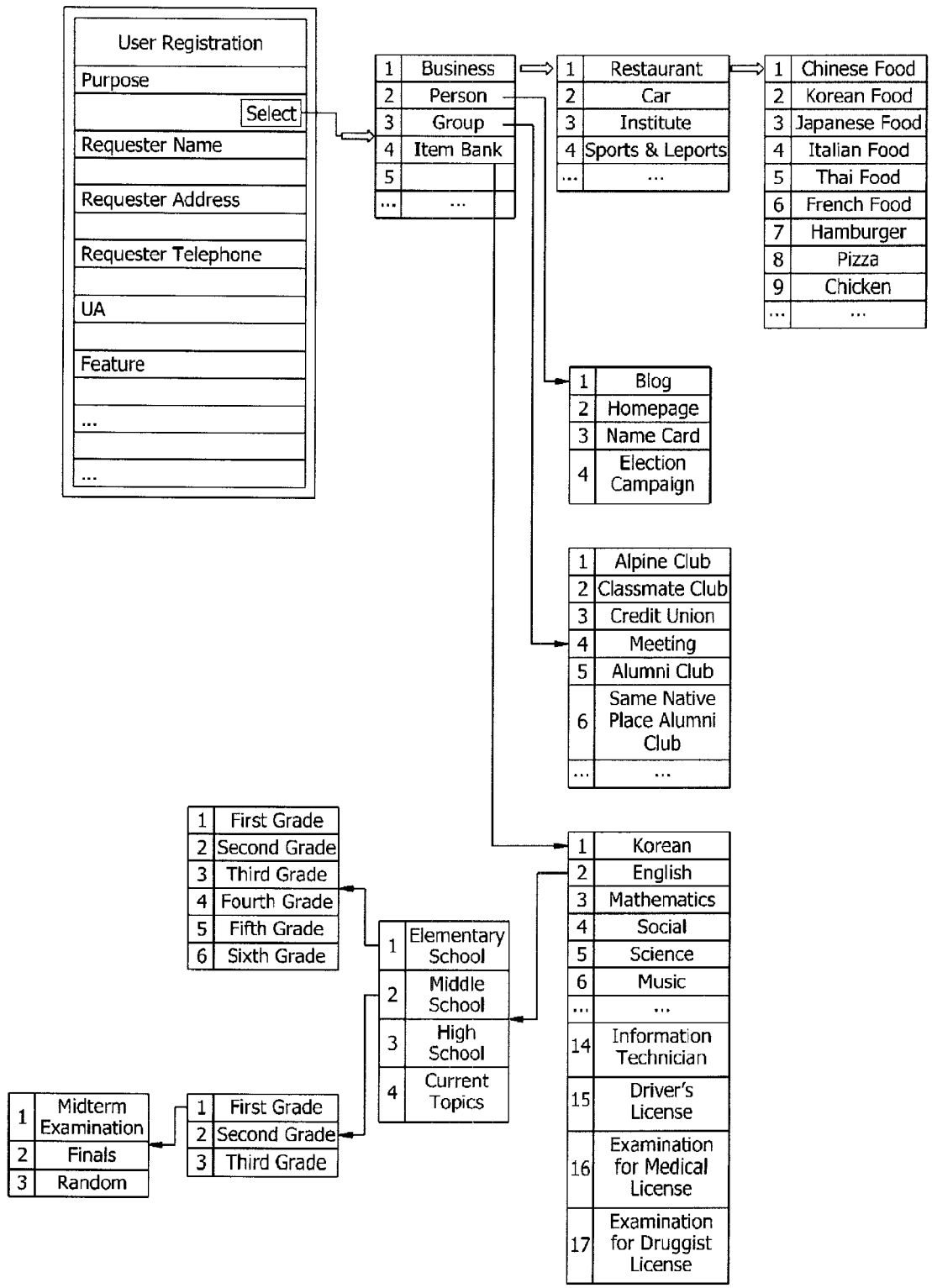
FIG. 4 is a view showing an example of a metadata frame for registering an information provider.

FIG. 4 is a view showing an example of a metadata frame for registration of an information provider.

Referring to FIG. 4, the metadata frame for registration of an information provider is composed of metadata items which are necessary to register an information provider. The metadata frame includes input forms such as for a homepage generation purpose, the name, address and phone number of a homepage generation requester, a user agent (UA), features, etc.

The information provider inputs metadata in the metadata items of the metadata frame for registration of an information provider (S303). The information provider executes character input through an input unit which is provided in the information provider 100, such as a keyboard, a keypad, and the like.

Among the metadata items of the metadata frame shown in FIG. 4, an input to a "Purpose" item can be executed directly by the information provider, or in such a manner that a selection is made from a menu presented, so as to ease the classification of homepages. That is to say, the latter case can be realized in such a manner that, when a "Select" icon is placed on the "Purpose" item and the information provider clicks the "Select" icon to select a homepage generation purpose (that is, a homepage use), a purpose menu of a tree structure is presented and the information provider can select any one of the purposes given in the purpose menu. Such a selective input scheme is not limited only to the "Purpose" item, and can be applied to other items which can be presented as menus.

The tree structure of the purpose menu can be defined to have upper level purposes and lower level purposes.

For example, "Business", "Person", "Group" and "Item Bank" can be defined as upper level purposes, and "Restaurant", "Car", "Academic Institute" and "Sports & Leports" can be defined as the lower level purposes of the "Business". Further, "Chinese Food", "Korean Food", "Japanese Food", and "Italian Food" can be defined as the lower level purposes of the "Restaurant". Further, it can be seen from FIG. 4, that the upper level purposes such as the "Person", "Group" and "Item Bank" can be defined with various lower level purposes. Besides, various purpose menus may be provided to the information provider depending upon the characteristics of the homepage.

The information provider can refer to the various purpose menus which are presented by the total homepage service providing system 200, and can select a purpose that conforms to a homepage to generate.

For example, an information provider, who wants to provide information regarding assembly activities, etc. on a homepage and use the homepage as a field of mutual understanding between the information provider and electors, can select an "Election Campaign" as the homepage generation purpose, and an information provider, who wants to use a homepage as a personal blog, can select a "00 Blog" as the homepage generation purpose.

When selecting the homepage generation purpose, as a matter of course, the information provider may not necessarily select a purpose of a lowermost level among the provided select menus. For example, an information provider does not need to necessarily select a menu of a level lower than the "Restaurant" menu, and can select the "Restaurant" being an intermediate level purpose as the homepage generation purpose.

When all the metadata items of the metadata frame for registration of an information provider are inputted by the information provider through the above-described procedure (S303), the inputted metadata for registration of an information provider are transmitted to the total homepage service providing system 200 (S304).

The information provider information administration section 211 registers the information provider by storing received metadata for registration of an information provider to the information provider information administration DB 212, and extracts the homepage generation purpose of the information provider from the metadata for registration of an information provider (S305).

Thereafter, the homepage generation section 221 of the total homepage service providing system 200 transmits homepage samples which conform to the extracted homepage generation purpose of the information provider, to the information appliance 100 of the information provider (S306). Homepage samples are stored in the homepage generation DB 222 by being classified for respective purposes, and the homepage generation section 221 searches, reads out and transmits the homepage samples which conform to the homepage generation purpose of the information provider, among the homepage samples stored in the homepage generation DB 222.

FIGS. 5 through 10 are views showing examples of homepage samples presented to the information provider when a homepage generation purpose corresponds to a "Restaurant".

Figure 5:
Figure 6:
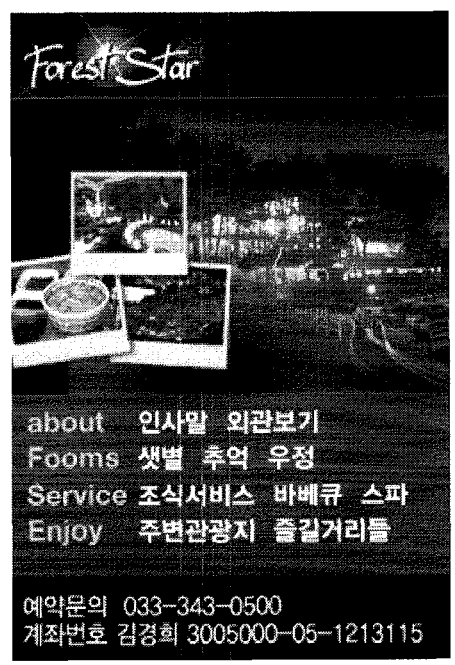
Figure 9:
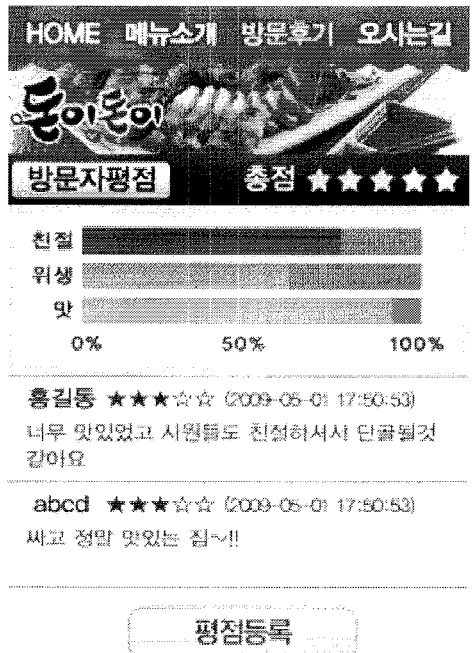
Figure 10:
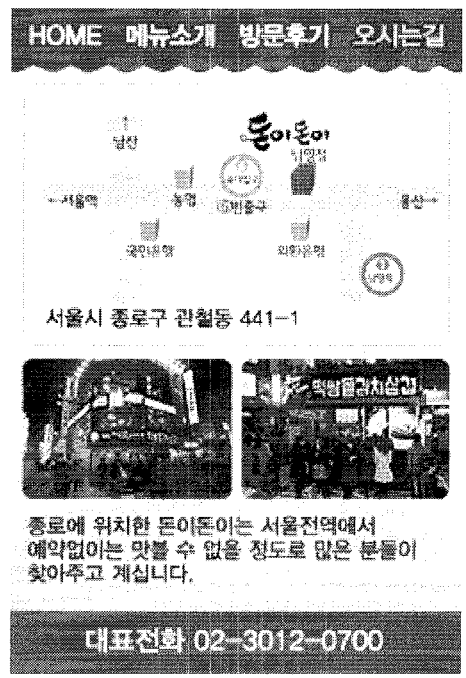

FIGS. 5 through 7 are views showing various initial screens, and FIGS. 8 through 10 are views showing detailed pages of the homepage shown in FIG. 7. Therefore, the screen shown in FIG. 8 is presented if a "Menu Introduction" item is selected in the homepage of FIG. 7, the screen shown in FIG. 9 is presented if an "After-visit Note" is selected, and the screen shown in FIG. 10 is presented if a "Guide Map" is selected.

When the various homepage samples are transmitted as described above, the information provider select a desired one among the presented samples (S307), and the homepage generation section 221 transmits a layout frame for the homepage sample selected by the information provider and a metadata frame for layout input, to the information appliance 100 of the information provider (S308).

A layout frame is a diagrammatic representation of texts, photos, tabs, etc. which are to be placed on the homepage, and the metadata frame for layout input is a frame in which metadata for layout input are to be inputted. The metadata for layout input indicate data which are to be recorded in the layout frame to constitute the homepage. The layout frame and the metadata frame for layout input are databased in the homepage generation DB 222 along with the homepage samples. According to this fact, the homepage generation section 221 reads out the layout frame and the metadata frame for layout input from the homepage generation DB 222 and transmits them to the information appliance 100 of the information provider.

Figure 11:
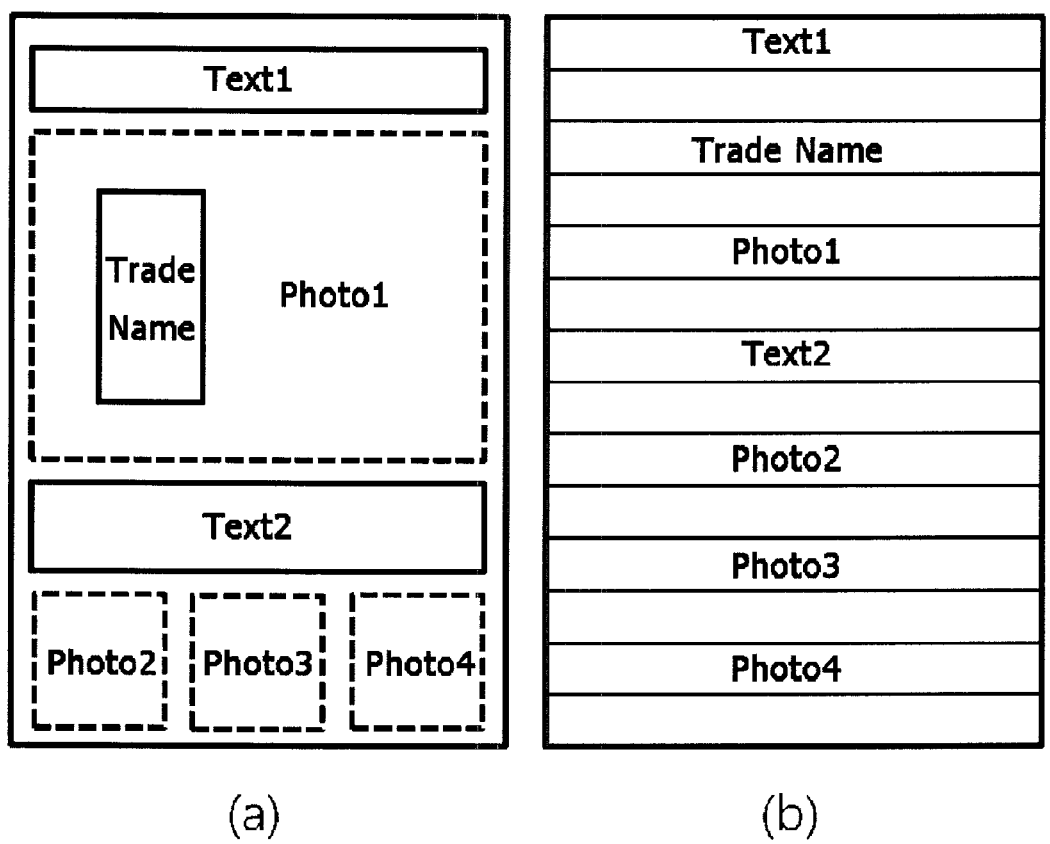
FIGS. 11 (a) and (b) and FIGS. 12 (a) and (b) are views illustrating examples of layout frames and metadata frames for layout input, respectively.
Figure 12:
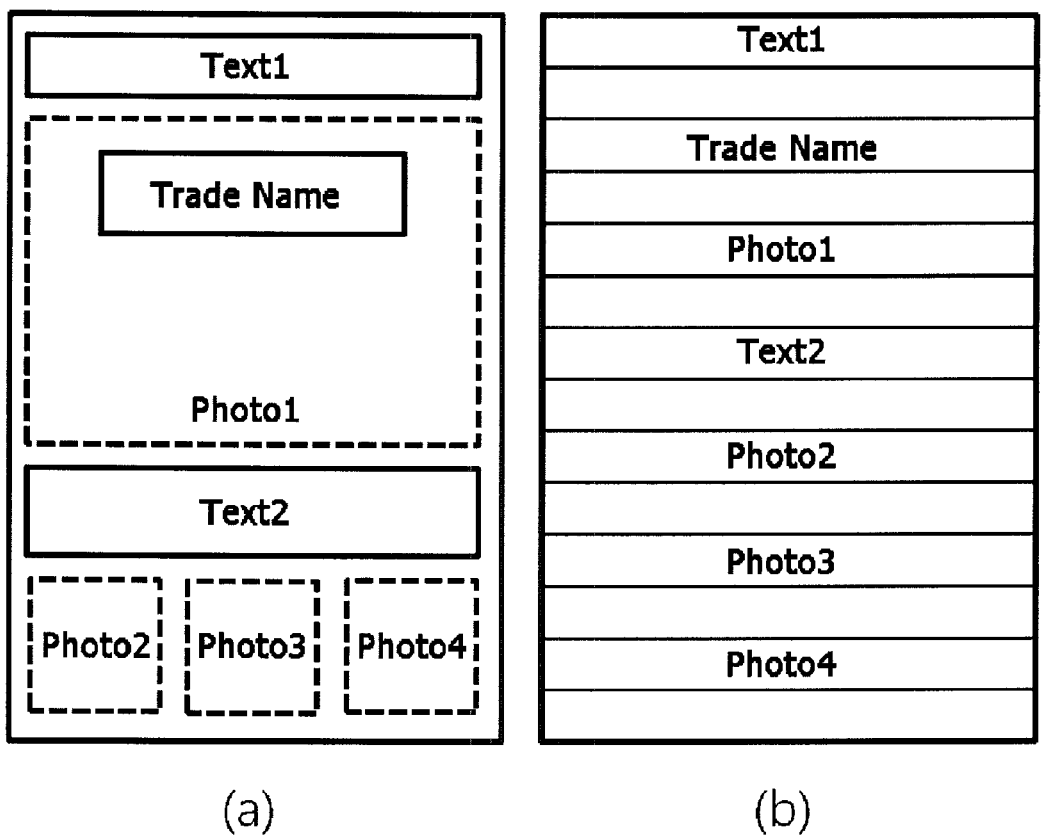
Figure 16:
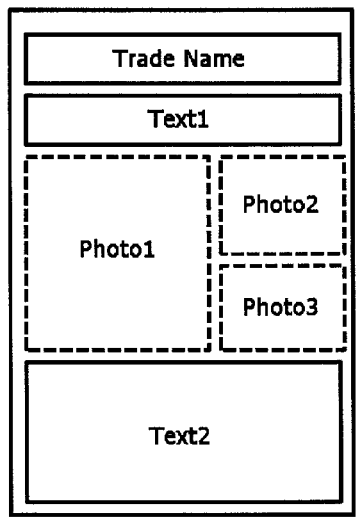

FIGS. 11 (a) and (b) and FIGS. 12 (a) and (b) are views illustrating examples of layout frames and metadata frames for layout input, respectively.

Referring to FIGS. 11 (a) and 12 (a), layout frames can be presented in a state in which texts, photos, etc. are placed therein in a variety of patterns. It can be seen from FIGS. 11 (a) and 12 (a) that trade name-related items are inserted in the layout frames in addition to texts, photos, etc. It is to be readily understood that layout frames can be configured to include other items. The metadata frames for layout input, which are shown in FIGS. 11 (b) and 12 (b), are presented to allow data corresponding to the layout frames to be inputted.

The information provider checks the layout frame for the selected homepage sample and the metadata frame for layout input, inputs metadata corresponding to the respective items of the layout frame, and transmits the resultant metadata frame to the total homepage service providing system 200 (S309), by which a procedure for generating a homepage is completed.

The homepage generation section 221 generates a homepage layout file using the metadata inputted from the information provider (S310).

FIGS. 13 (a) and (b) through FIGS. 21 (a) and (b) are views illustrating examples of layout frames and homepage layout files, respectively. Homepage layout files must be differently generated depending upon the configurations of layout frames. The homepage layout files can be generated not only using HTML, XML, XHTML, PHP, JAVA, Flash and FLEX script languages but also through language files which are databased in a variety of ways to realize homepages.

The homepage layout files shown in FIGS. 13 (b) through 21 (b) represent examples in which homepages are generated for portable phones using HTML. A homepage layout should be set depending upon a kind of the information appliance 100 of the information provider so that the homepage layout conforms to the kind of the information appliance 100 of the information provider.

In the embodiment of the present invention, a layout frame and a metadata frame for layout input are provided for each homepage sample, and this applies the same in the case of a homepage layout file. Namely, a homepage layout file is provided for each homepage sample. In the homepage layout file for the homepage sample, places to be inputted with metadata are provided as blanks. After the information provider inputs the metadata and the blanks are filled with the metadata, a final homepage layout file is generated.

A homepage layout file of each homepage sample is provided in each language. That is to say, for one homepage sample, homepage layout files, which are generated using various languages such as HTML, XML, XHTML, PHP, JAVA, Flash and FLEX script languages, are provided. Accordingly, the final homepage layout file can be generated in each of various languages. Due to this fact, the embodiment of the present invention provides advantages in that a homepage can be realized in the information appliance of a user using the homepage layout file which is generated in a language suitable for the information appliance regardless of what kind the information appliance of the user belongs to.

Figure 22:
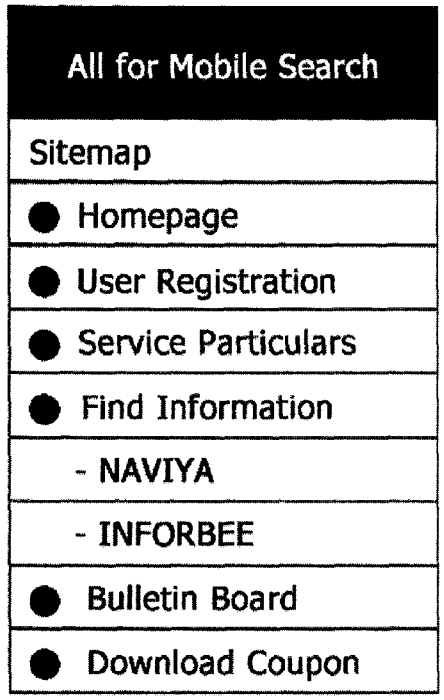
FIGS. 22 (a) and (b) are views respectively illustrating examples of an actually generated homepage and a homepage layout file written in an HTML to realize the homepage.
Figure 23:
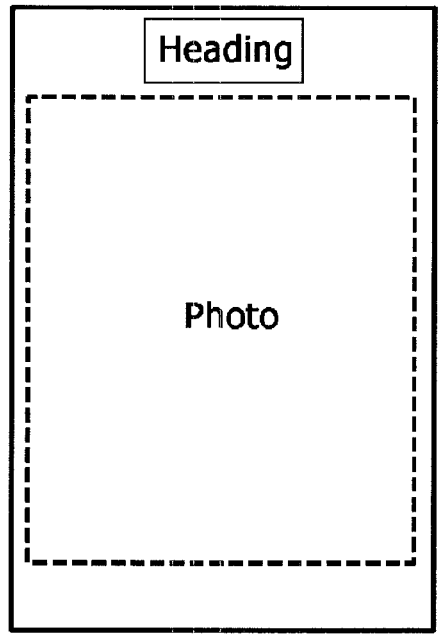
FIGS. 23 through 29 are views illustrating layout frames in which metadata frames for input are incorporated.
Figure 24:
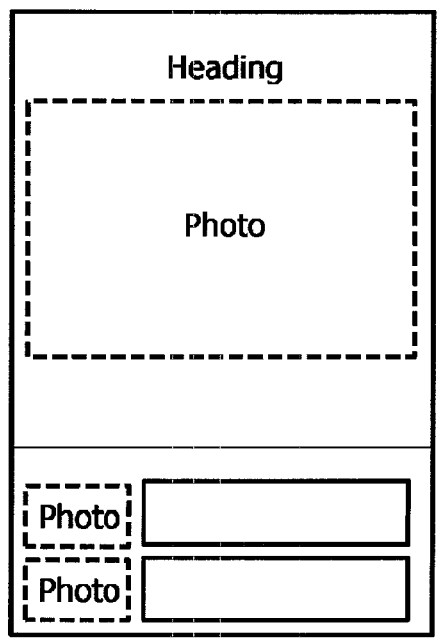
Figure 25:
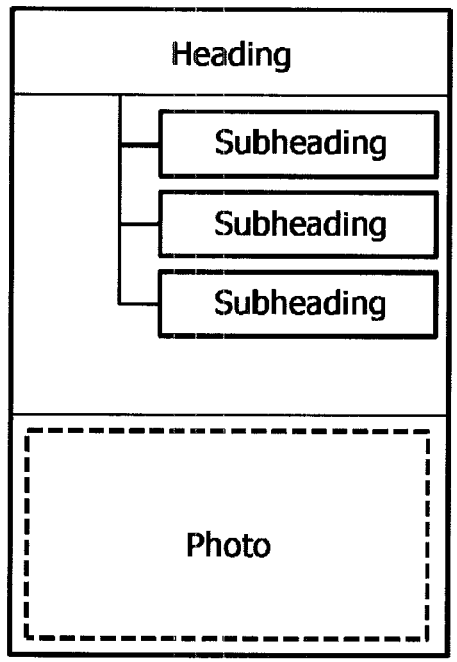
Figure 26:
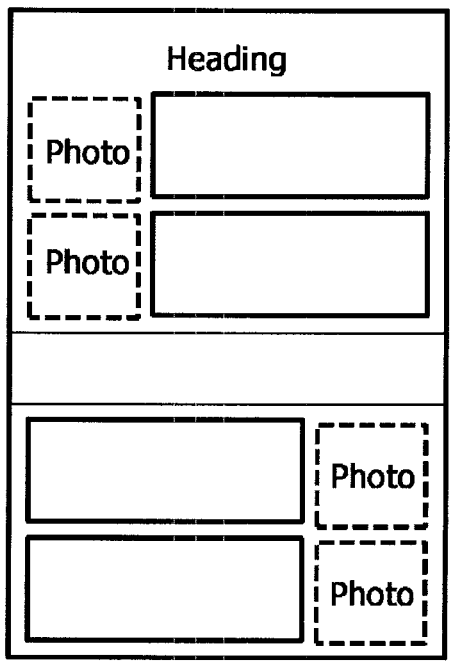
Figure 27:
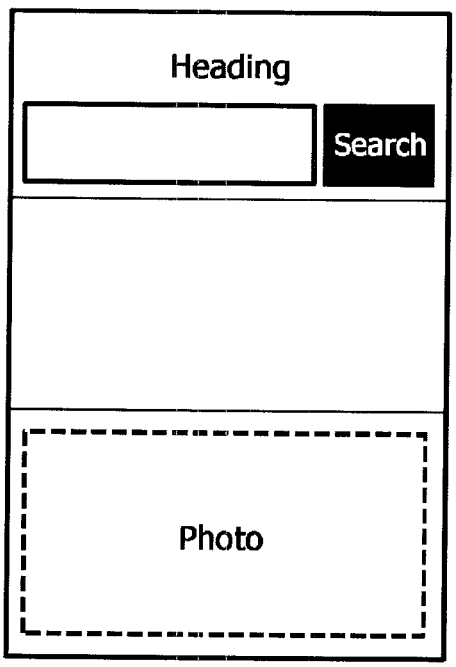
Figure 28:
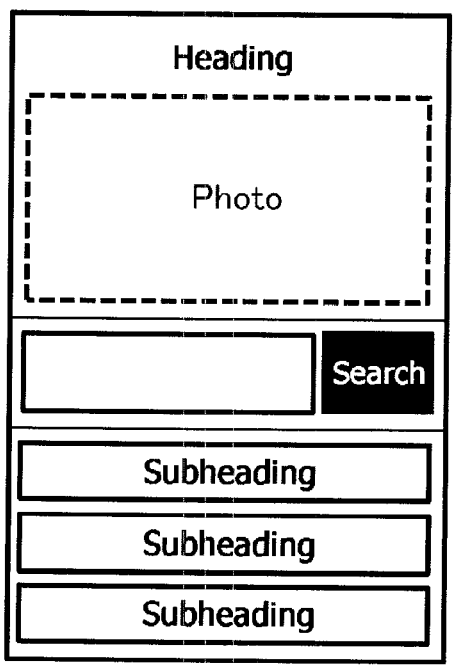
Figure 29:
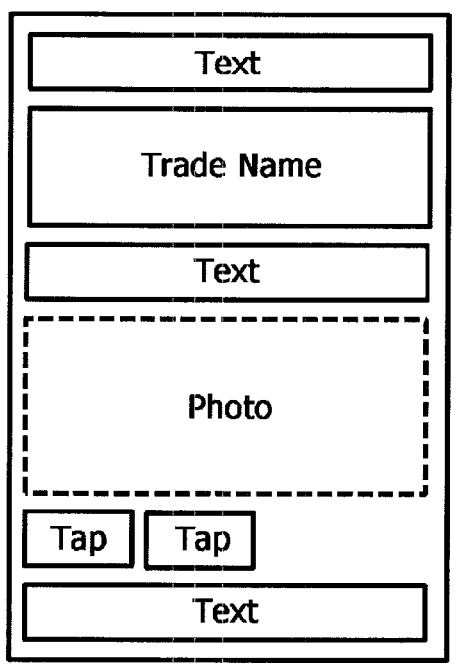

FIGS. 22 (a) and (b) are views respectively illustrating examples of an actually generated homepage and a homepage layout file written in an HTML to realize the homepage.

When the final homepage layout file is generated through the above-described procedure (S310), the homepage generation section 221 transmits the generated homepage to the information appliance 100 of the information provider (S311).

The information provider checks the homepage received by the information appliance 100 of the information provider, and transmits whether or not to accept the homepage, to the total homepage service providing system 200 (S312). If the homepage is finally approved by the information provider (S312-Y), the homepage generation section 221 stores the generated homepage layout file in the homepage file storage DB 232 (S313), and generates the homepage through the homepage layout file, by which the automatic homepage generation procedure is completed. As the occasion demands, the homepage generation section 221 can generate the sitemap of the homepage. The homepage layout file and sitemap information are incorporated when generating the homepage.

If the homepage is not finally approved by the information provider (S312-N), in order to correct the homepage, the method can be restarted from the step S306 of presenting the homepage samples or from the step S308 of transmitting the layout frame and the metadata frame for layout input.

In another embodiment of the present invention, when providing the metadata frame for registration of an information provider, the homepage samples and the layout frame and the metadata frame for layout input may be simultaneously provided to the information provider.

In other words, instead of providing a plurality of homepage samples in correspondence to a homepage generation purpose and thereby allowing the information provider to select any one of the provided homepage samples, only one homepage sample may be designated to each homepage generation purpose and may be provided to the information provider. Therefore, since the homepage sample providing step S306 and the homepage sample selecting step S307 can be omitted, the procedure can be simplified. Moreover, because the step S302 of transmitting the metadata frame for registration of an information provider and the step S308 of transmitting the layout frame and the metadata frame for layout input can be combined and the step S303 of inputting the metadata for registration of an information provider and the step S309 of inputting the metadata for layout input can be combined, the homepage generation procedure can be further simplified.

Furthermore, in the case where only one homepage is provided for each homepage generation purpose, homepages with the same homepage generation purpose can be consistently generated. As a consequence, since the configurations of homepages can be uniformized, information users can conveniently use the homepages, and since the ways of using the homepages can be standardized, a procedure for learning the ways of using the homepages is unnecessary.

In addition, while the above-described embodiment is realized in such a manner that the layout frame and the metadata frame for layout input for the homepage sample selected by the information provider are provided together to the information provider and the information provider directly inputs the metadata in the metadata frame for layout input, this scheme may be changed as well.

For example, it is conceivable that only the layout frame for the homepage sample selected by the information provider is provided to the information provider and the information provider directly inputs the metadata in the layout frame itself. That is to say, the metadata frame for layout input may not be separately defined, and instead, may be incorporated into the layout frame.

Examples corresponding to this scheme are shown in FIGS. 23 through 29. Referring to FIGS. 23 through 29, metadata input is executed in such a manner that input boxes are defined in each layout frame and the information provider fills the input boxes. "Tab" items shown in FIG. 29 indicate interface means for moving to other pages in a home page. If the information provider selects the "Tab" in the metadata input step, a layout frame for a page to be linked to the selected tab is provided.

Figure 30:
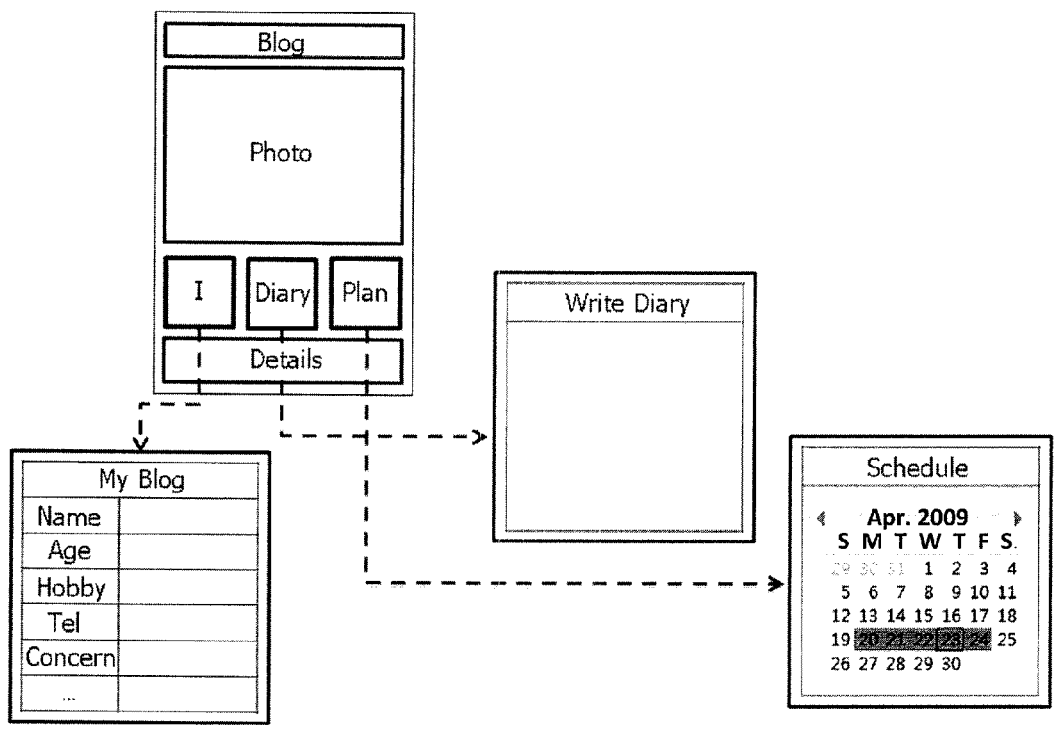
FIG. 30 is a view illustrating an example of a personal homepage which is generated through the above processes.

FIG. 30 is a view illustrating an example of a personal homepage which is generated through the above-described procedure and in which the total number of pages is determined depending upon the configuration of a main page. In detail, as component elements of "I", "Diary" and "Plan" are defined in a "000 Blog" as a main page, it can be appreciated that a page for the "I" item, a page for the "Diary" item and a page for the "Plan" item are respectively constructed.

In the embodiment of the present invention, an information appliance by which the information provider generates the homepage and an information appliance by which the homepage is used by an information user may be different from each other. For example, even though the homepage is used by a portable phone, the homepage generation procedure need not be implemented by a portable phone and may be implemented using a desktop computer in view of the information provider's convenience.

Hereafter, a procedure for providing a total service from a service for registering the homepage generated by the homepage generation section 221 and stored in the homepage file storage DB 232, in the homepage registration server 233 to a homepage search service will be described with reference to FIG. 31.

Figure 31:
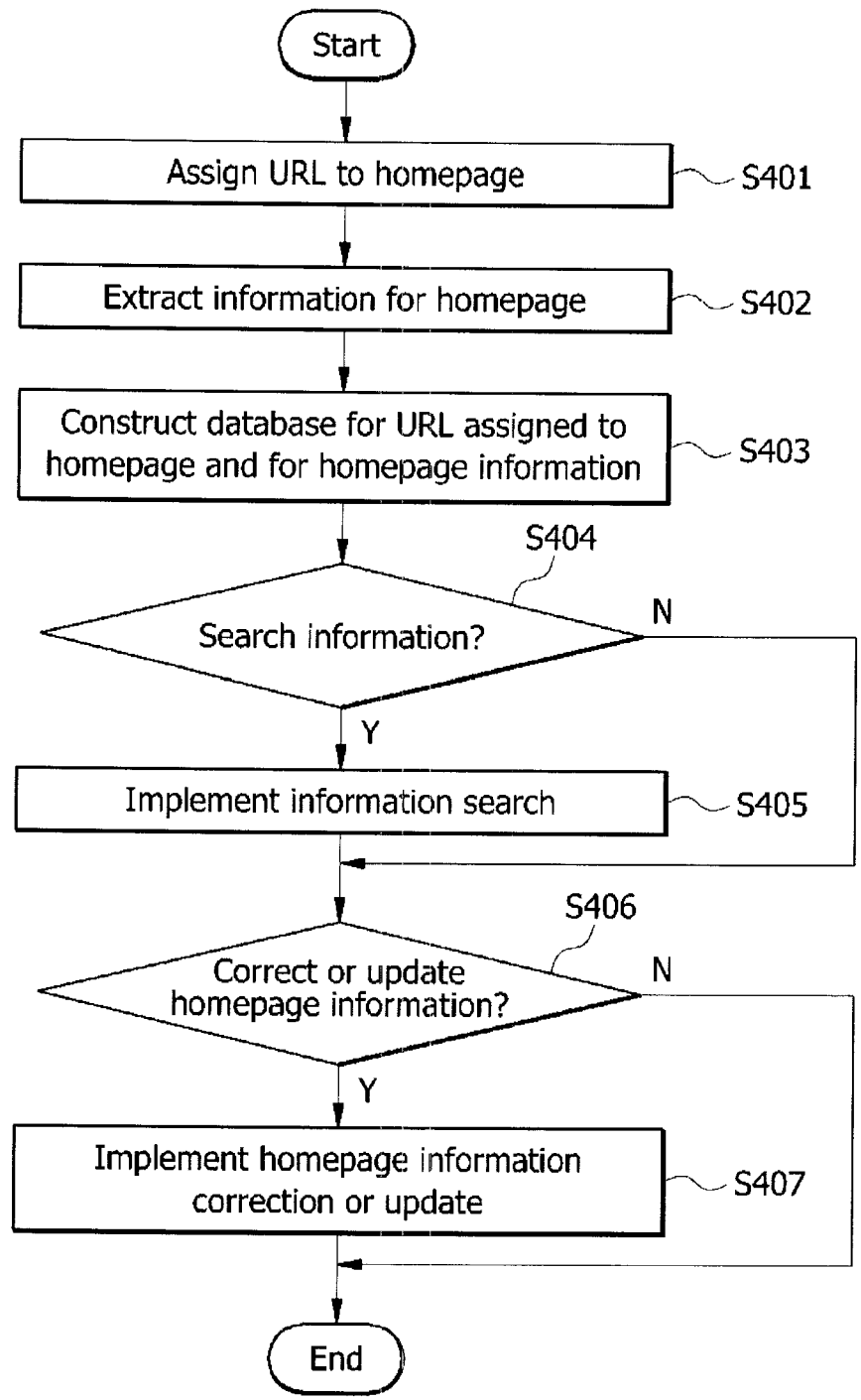
FIG. 31 is a flow chart illustrating a homepage registration service providing method in accordance with another embodiment of the present invention.

FIG. 31 is a flow chart illustrating a total homepage service providing method using the total homepage service providing system 200, in accordance with another embodiment of the present invention.

First, the registration of the homepage is implemented in such a manner that a URL (uniform resource locator) is assigned to the generated homepage and information of the homepage is recorded in the homepage registration server 233.

In detail, the homepage registration section 231 assigns the URL to the homepage which is generated by the homepage generation section 221 and stored in the homepage file storage DB 232 (S401). The assigned URL can be realized as a domain name or an IP address.

Figure 32:
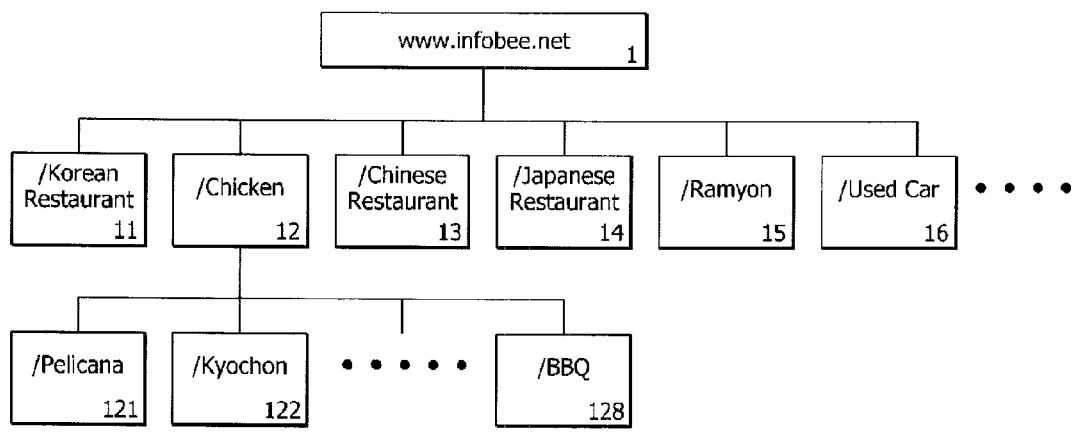
FIGS. 32 and 33 are views illustrating exemplary URL assignment methods.
Figure 33:
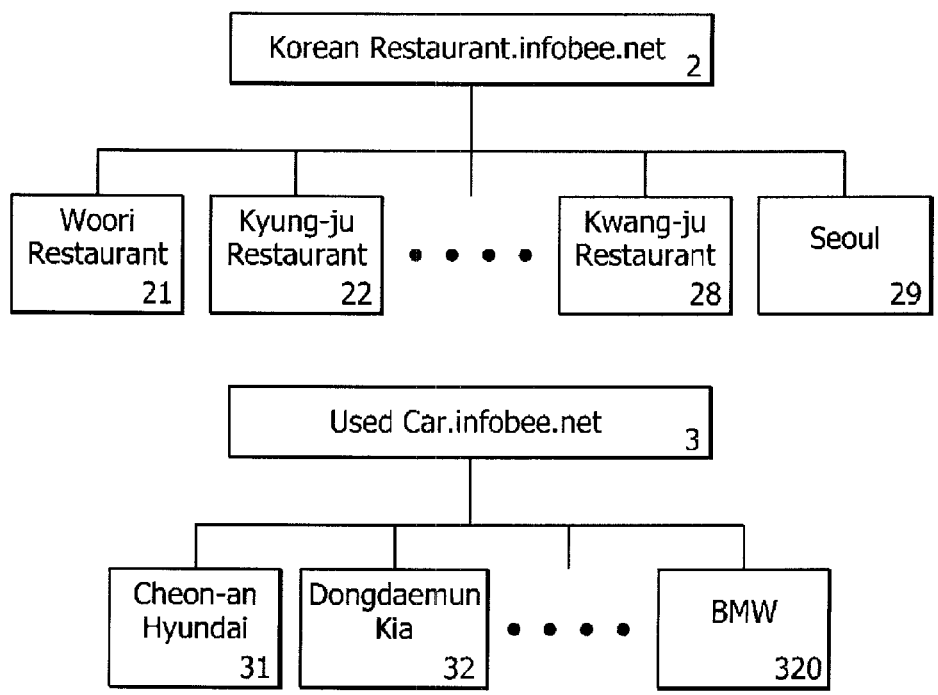

FIGS. 32 and 33 are views illustrating exemplary URL assignment methods.

First, in FIG. 32, a method of assigning lower URLs from one domain name to respective homepages is illustrated. In FIG. 32, when assuming that the basic URL of the total homepage service providing system 200 is "www.infobee.net", URLs of other homepages can be assigned as "www.infobee.net/koreanfood", "www.infobee.net/chicken", "www.infobee.net/chicken/pelicana", "www.infobee.net/chicken/kyochon", "www.infobee.net/chicken/BBQ", etc.

In FIG. 33, a method of assigning the URLs of homepages as sub domain names is illustrated. Namely, referring to FIG. 33, upper items such as "koreanfood.infobee.net", "usedcar.infobee.net", etc. are assigned as sub domain names, and lower URLs can be assigned to lower items as shown in FIG. 32. For example, the URLs of the homepages which are subordinate to "koreanfood.infobee.net" can be assigned as "koreanfood.infobee.net/ourhouse", "koreanfood.infobee.net/Gyeongju", etc.

By assigning numbers to respective domain names and thereby numericalize the respective domain names, the numbers can be used as IP addresses in the administration of homepages. For example, referring to FIG. 32, "www.infobee.net/koreanfood" can be represented as "111", and "www.infobee.net/chicken/kyochon" can be represented as "112122".

Thereafter, the homepage registration section 231 extracts various information regarding the homepage from the information provider information administration DB 212 and the homepage file storage DB 232 (S402). The information regarding the homepage which is extracted in the information extracting step S402 can include not only information regarding the homepage information provider and information regarding the homepage layout file itself but also the metadata which are inputted by the information provider and are recorded in the homepage layout file.

Next, the homepage registration section 231 records the extracted homepage information in the homepage registration server 233, and constructs a DB (S403).

FIG. 34 is a view illustrating an example of a DB structure of the homepage registration server 233, in which the extracted homepage information is used to construct the DB as a table-structured relational model.

The uppermost row of the table shown in FIG. 34 represents items of the homepage information, and the values for the respective items are recorded in lower rows. For example, the items of the homepage information can include "Homepage No.", "Homepage URL", "Date of Generation", "Date of Correction", "Keyword 1", "Keyword 2", "Keyword 3", "Information Provider ID", "Information Provider PW", "UA", and "Homepage File No.".

The numericalized information of the URLs is recorded in the "Homepage No." item. The "Homepage No." item can be effectively used when classifying and searching business categories, business types and homepage generation purposes.

The dates, at which the homepage layout file is generated and corrected, are respectively recorded in the "Date of Generation" and "Date of Correction" items. An entry No. of the homepage layout file to the homepage file storage DB 232 is recorded in the "Homepage File No." item, and is referred to when reading out the homepage layout file from the homepage file storage DB 232.

The "Information Provider ID", "Information Provider PW" and "UA" represent the information of the information provider. The information of the information provider can be extracted from the information provider information administration DB 212. The "UA" item represents a web browser which analyzes identification information transmitted from a specified web browser and an HTTP (hypertext transfer protocol) and performs a rendering task. If a homepage is used in a portable phone, information regarding the web browser of the corresponding portable phone is recorded in the "UA" item. The "UA" item is used to provide information capable of displaying a homepage in conformity with the UA of the portable phone even though the web browser adopted in the portable phone is different.

"Keyword 1", "Keyword 2" and "Keyword 3" are extracted from the metadata which are recorded in the homepage layout file. The extraction of keywords can be implemented manually or automatically, which will be described later in detail.

Then, when an information search through the homepage registration server 233 is necessary (S404-Y), the homepage registration section 231 conducts the information search through the homepage registration server 233 (S405). The information search through the homepage registration server 233 can be conducted not only by the homepage registration section 231 but also by the homepage index generation section 241 or the homepage search section 251, which will be described later in detail.

If information correction or update is required in the homepage registration server 233 (S406-Y), the homepage registration section 231 performs the information correction or update in the homepage registration server 233 (S407).

In another way of realizing the present invention, the homepage registration server 233 and the homepage file storage DB 232 may be formed to be incorporated with each other.

Hereafter, a procedure of extracting keywords from the homepage layout file through the homepage registration section 231 will be described with reference to FIG. 35.

Figure 35:
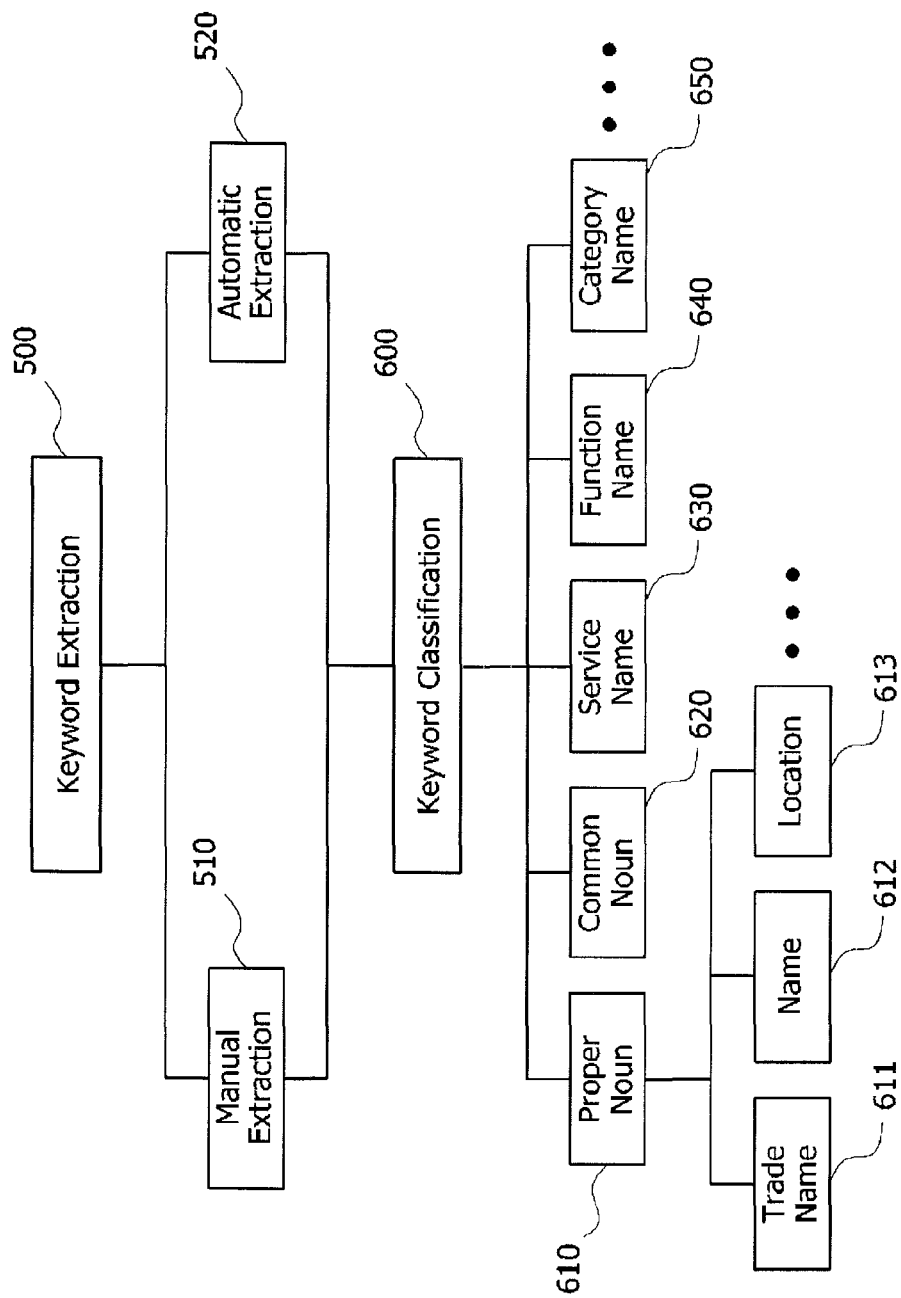
FIG. 35 is a view diagrammatically illustrating a homepage keyword extraction and classification method in accordance with another embodiment of the present invention.

FIG. 35 is a view diagrammatically illustrating a homepage keyword extraction and classification method using the total homepage service providing system 200, in accordance with another embodiment of the present invention.

Referring to FIG. 35, keyword extraction 500 can be implemented through manual extraction 510 or automatic extraction 520. Any one or both of the manual extraction 510 and the automatic extraction 520 can be employed.

First, in the manual extraction 510, an administrator of the total homepage service providing system 200 directly extracts appropriate keywords by referring to the metadata recorded in the homepage layout file. Due to this fact, the manual extraction scheme 510 is advantageous in that precise extraction of keywords is possible.

Next, the automatic extraction 520 is performed by a crawler in such a manner that keywords are automatically extracted from the metadata recorded in the homepage layout file using the crawler. Concretely speaking, in the automatic extraction scheme 520, keywords are extracted using the crawler which is a software for extracting and analyzing a character string defined or described in portions such as "Keyword" and "Description" as TAG elements among the metadata of an HTML file being the description language of a homepage.

Meanwhile, keywords can be extracted not only from the homepage layout file which is stored in the homepage file storage DB 232 but also from the information of the information provider which is stored in the information provider information administration DB 212.

As described above, the metadata, which are directly inputted by the information provider through the frame for registration of an information provider, are stored in the information provider information administration DB 212. The metadata include the personal information of the information provider, the homepage generation purpose, the UA, the features, and so on. Accordingly, these information can be extracted manually or automatically and can be used as keywords.

Extracted keywords are classified by kinds thereof.

Keyword classification 600 includes classifications by proper noun 610, common noun 620, service name 630, function name 640, and category name 650.

In the classification by proper noun 610, keywords are classified by proper nouns such as of a trade name, a name, a location, and so on. In the classification by common noun 620, keywords are classified by common nouns such as a flower shop, a car, and so on. In the classification by service name 630, keywords are classified by service names such as proxy driving, charge-free delivery, and so on. Also, in the classification by function name 640, keywords are classified by function names such as diet, health, and so on. In the classification by category name 650, keywords are classified by category names such as liquor, noodle, Korean food, Japanese food, and so on.

The keywords which are classified by the keyword classification can be re-classified into sub-classifications. For example, the keywords classified by proper noun 610 can be re-classified by trade name 611, name 612 and location 613.

The keyword classification and the keyword re-classification can be implemented manually or automatically in the same manner as in the keyword extraction.

The keywords, which are extracted and classified through the above-described procedure, can be used in generation of homepage indexes for information search services.

Homepage indexes represent information for homepages in which specified keywords are recorded. The information of homepages is acquired by referring to the information provider information administration DB 212, the homepage file storage DB 232, the homepage registration server 233, etc., and is stored in the homepage index DB 242. The homepage indexes can be reconstructed by referring to the homepage index DB 242.

The homepage index generation section 241 generates homepage indexes by keywords, and stores the generated homepage indexes to the homepage index DB 242. The information of homepages can be differently realized in each homepage index.

FIGS. 36 through 38 are views illustrating examples of configuring homepage information by indexes, wherein FIG. 36 shows a famous restaurant index, FIG. 37 shows a personal index, and FIG. 38 shows a service index.

The famous restaurant index shown in FIG. 36 indicates a homepage index which includes information for homepages having the keyword of "Famous Restaurant" classified as a common noun. Items such as "Trade Name", "Location", "Main Menu", "Homepage Storage Location", "Date of Update", "Address", "Phone Number", "Reputation (Taste)", and so on are recorded in the famous restaurant index.

The personal index shown in FIG. 37 indicates a homepage index which includes information for homepages having the keyword of "Name" classified as a proper noun. Items such as "Name", "Occupation", "Resident Registration Number", "Address", "Phone Number", "Homepage Storage Location", "Date of Update", and so on are recorded in the personal index.

The service index shown in FIG. 38 indicates a homepage index which includes information for homepages having service names as a keyword. Items such as "Service Name", "Service Area", "Trade Name", "Phone Number", "Homepage Storage Location", "Reputation (Service)", "Date of Generation", and so on are recorded in the service index.

In this way, in the embodiment of the present invention, homepage information is constructed as indexes which are databased into table structures, and these indexes can be used to provide search results when the information users use homepage searches afterwards.

The above-described keyword extraction and classification procedures can be implemented by disposing a separate keyword extraction and classification section including a crawler in the total homepage service providing system 200, or may be implemented by the homepage index generation section 241.

In the embodiment of the present invention, when generating homepage indexes, the homepage indexes can be constructed in such a manner that searches using search terms composed of "Adjective+Keyword" can be conducted in response to information searches. In general, since the search terms composed of "Adjective+Keyword" are constructed such that adjectives modify keywords, the adjectives mean the evaluation values (reputations) for the keywords. To this end, in the embodiment of the present invention, reputation indexes are additionally generated mainly on the basis of the evaluation values (reputations), and are stored in the homepage index DB 242.

The reputation indexes can be generated through reconstruction based on the information of the homepage index DB 242. The reputation indexes can be generated through automatic collection of evaluation values (reputations) using an evaluation data collection crawler as reconstruction means or through manual collection.

Figure 39:
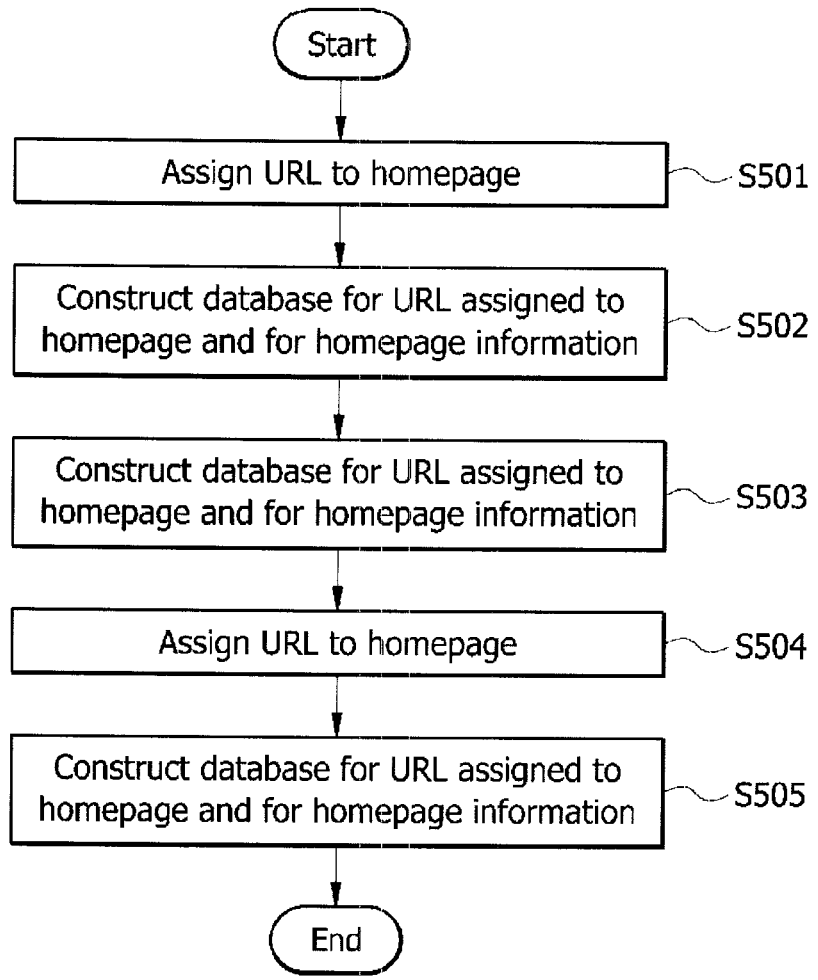
FIG. 39 is a flow chart illustrating a reputation index generation procedure.

FIG. 39 is a flow chart illustrating a reputation index generation procedure.

Referring to FIG. 39, first, the homepage index generation section 241 accesses homepages by fields among the homepages which are stored in the homepage registration server 233 (S501). Here, the homepages by fields may be homepages by respective categories, for example, homepages in a restaurant category, homepages in an oil station category, etc.

Next, the homepage index generation section 241 finds evaluation pages which are dispersed in the accessed homepages and searches evaluation factors in the evaluation pages (S502). The evaluation pages mean pages in which the information of evaluation performed by information evaluators for on-line homepages or off-line products or services provided by information providers is recorded, and the evaluation factors mean evaluation information inputted by the information evaluators and have respective evaluation values (reputations).

In order to search such evaluation factors from evaluation pages, the homepage index generation section 241 can refer to the evaluation term dictionary 243. In detail, the homepage index generation section 241 searches the evaluation terms recorded in the evaluation term dictionary 243, from the evaluation pages.

The evaluation term dictionary 243 is a dictionary in which the evaluation terms frequently recorded in the evaluation pages of homepages by information evaluators are written. One example of the evaluation term dictionary 243 is shown in FIG. 40.

Referring to FIG. 40, information for evaluation factor, evaluation adjective and part of speech of evaluation factor is recorded in the evaluation term dictionary 243. Among the search terms composed of "Adjective+Keyword", the "Adjective" belongs to the evaluation adjective.

Thereupon, the homepage index generation section 241 sorts homepages by evaluation factors, using the searched evaluation factors and evaluation values (reputations) (S503).

In detail, the homepage index generation section 241 sorts homepages by evaluation factors such as taste, service, atmosphere, price, distance, and so forth, using the evaluation values (reputations) corresponding to the respective evaluation factors.

Next, the homepage index generation section 241 determines the name of a reputation index by combining an evaluation adjective and a keyword for a homepage (S504), generates a reputation index for the information of the homepages sorted according to the determined name, and stores the reputation index in the homepage index DB 242 (S505).

For example, by searching and sorting the evaluation values (reputations) recorded in homepages for evaluation factor of "Taste", a new index having ranked evaluation values (reputations) for "Taste" is generated. The index generated in this way is a reputation index for "Taste".

Not only the information of the homepages sorted in order of rank but also the ranks, reputations and evaluation terms of the respective homepages can be recorded together in the reputation index.

The homepage index generation section 241 acquires the information for the homepages from the information provider information administration DB 212, the homepage file storage DB 232, the homepage registration server 233, and the homepage index DB 242 as described above.

The homepage reputation information and the evaluation term information recorded in the reputation index can use the information searched in the evaluation term searching step S502.

FIGS. 41 and 42 are views illustrating examples of reputation indexes generated through the above-described steps. FIGS. 41 and 42 respectively show reputation indexes for "Delicious Food" and "Cheap Oil Station".

Referring to FIG. 41, homepages are sorted in order of reputation for taste when a reputation index is generated for food. It can be understood that an evaluation adjective "Delicious" is combined with a business category, that is, "Food" as the keyword of corresponding homepages, and thereby, a reputation index for "Delicious Food" is generated.

In the reputation index shown in FIG. 42, there is stored information of oil station homepages which are sorted in order of low price. Here, it can be understood that an evaluation adjective for price is "Cheap". The evaluation adjective of "Cheap" is combined with a business category as a homepage keyword, that is, "Oil Station", and thereby, a reputation index for "Cheap Oil Station" is generated.

When reputation indexes are used in these ways, searches for "Adjective+Keyword" such as "Delicious Food" and "Kind Proxy Driving" can be quickly and precisely conducted. That is to say, in the present invention, lifestyle-friendly and meaning analysis type search services can be provided to information users through the reputation indexes.

Concretely speaking, in the system 200 according to the embodiment of the present invention, if the search term of "Delicious Food" is inputted, homepages, which have a business field or a category belonging to "Food", are provided in order of "Taste" from the reputation index related with "Delicious".

Figure 43:
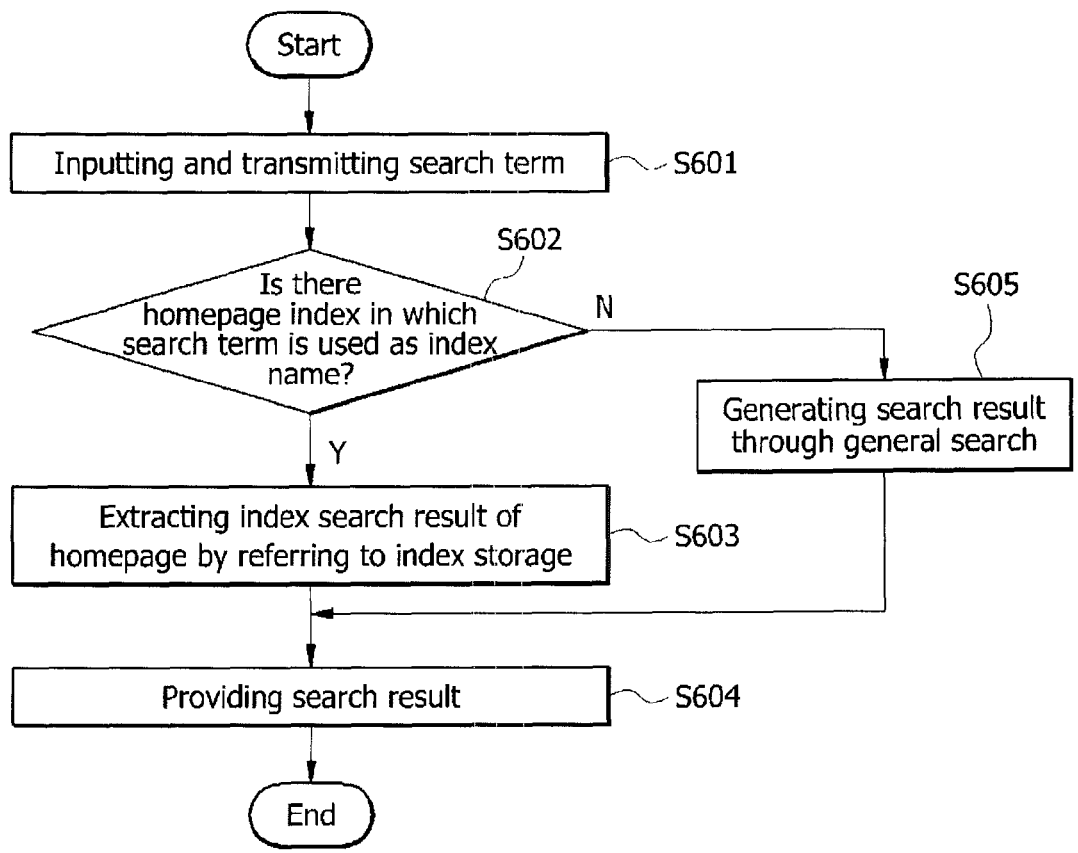
FIG. 43 is a flow chart illustrating a homepage search process.

FIG. 43 is a flow chart illustrating in detail a homepage search process.

Referring to FIG. 43, a search term, which is inputted through the information appliance 100 of an information user, is transmitted to the total homepage service providing system 200 according to the present invention (S601).

A search pattern which is inputted by the information user can be produced in a single "Word" type or a combination of at least two words. That is to say, a search pattern can have a "Word+Word" type. For example, in the case where a search term is composed of "Word+Word", the search term can be "Location+Keyword" or "Adjective+Keyword" such as "Delicious Pizza".

The homepage search section 251 checks if there is a homepage index in which the search term transmitted from the information appliance 100 of the information user is used as an index name, by referring to the search term dictionary 252 (S602).

Referring to FIG. 44 showing an example of the search term dictionary 252, the search term dictionary 252 includes "Search Word/Phrase", "Common Reputation Index Name", "Related Index", and "Index Storage Location".

The "Common Reputation Index Name" is used as having one meaning that represents "Search Word/Phrase" of similar meanings. For example, "Delicious Roast Meat" can be set as a common meaning, that is, a common reputation index of various search terms such as "Delicious Roast Meat", "Tasty Roast Meat", "Nice Roast Meat", and so on, and "Good Service Bank" can be set as a common reputation index of search terms such as "Good Service Bank", "Kind Bank", "Good Bank", "Good Atmosphere Bank", and so on.

"Related Index" is a homepage index which has a name related with the words recorded in "Search Word/Phrase" or "Common Reputation Index Name", and "Index Storage Location" is a location where "Related Index" is stored.

As a result of checking, if it is determined that there is a homepage index in which the search term inputted by the information user is used as an index name (S602-Y), the homepage search section 251 extracts the corresponding homepage index as a search result, by referring to the index storage location recorded in the search term dictionary 252 (S603).

For example, in the case where a search term is "Wine", the homepage search section 251 reads out a "Liquor" index related with "Wine", from the homepage index DB 242. In the case where a search term is "Cheap Oil Station" as a pattern of "Adjective+Keyword", if the "Cheap Oil Station" index is generated in the homepage index DB 242 as shown in FIG. 42, the homepage search section 251 can read out the "Cheap Oil Station" index.

In the case of an extended search term such as "Yeoksam-dong Cheap Oil Station", the homepage search section 251 divides the search term into "Yeoksam-dong", "Cheap" and "Oil Station" and searches related homepage indexes from the search term dictionary 252 by combining the divided search terms in a variety of ways. For example, if a homepage index related with "Yeoksam-dong" does not exist in the search term dictionary 252 and only a homepage index related with "Cheap Oil Station" exists in the search term dictionary 252, the homepage search section 251 extracts only information of a cheap oil station which has a location of "Yeoksam-dong", from the cheap oil station index.

Similarly, even in the case of a complicated search term such as "Good Atmosphere Good Service Chip Italy Restaurant", searches can be conducted through various combinations of words.

Since all the databases constructed in the system 200 according to the embodiment of the present invention can be realized as relational database models with table structures, the search process can be conducted through a SQL (structured query language).

Thereafter, the homepage search section 251 provides a searched and extracted result to the information appliance 100 of the information user as a search result (S604). At this time, a homepage arranging order in the search result may of course be modified depending upon a search condition of the information user.

In the case where a homepage index, in which the search term transmitted from the information appliance 100 of the information user is used as an index name, does not exist (S602-N), the homepage search section 251 conducts a general search, produces a search result (S605), and provides the search result to the information appliance 100 of the information user (S604).

The general search does not mean a search based only on the homepage index DB 242, but means that a total search is conducted by generally referring to the information provider information administration DB, the homepage file storage DB 232, the homepage registration server 233 and the homepage index DB 242 and through this, a search result is produced.

Hereafter, the functions of the homepage access history information generation and administration unit 260 will be described in detail.

Figures 45, 46:
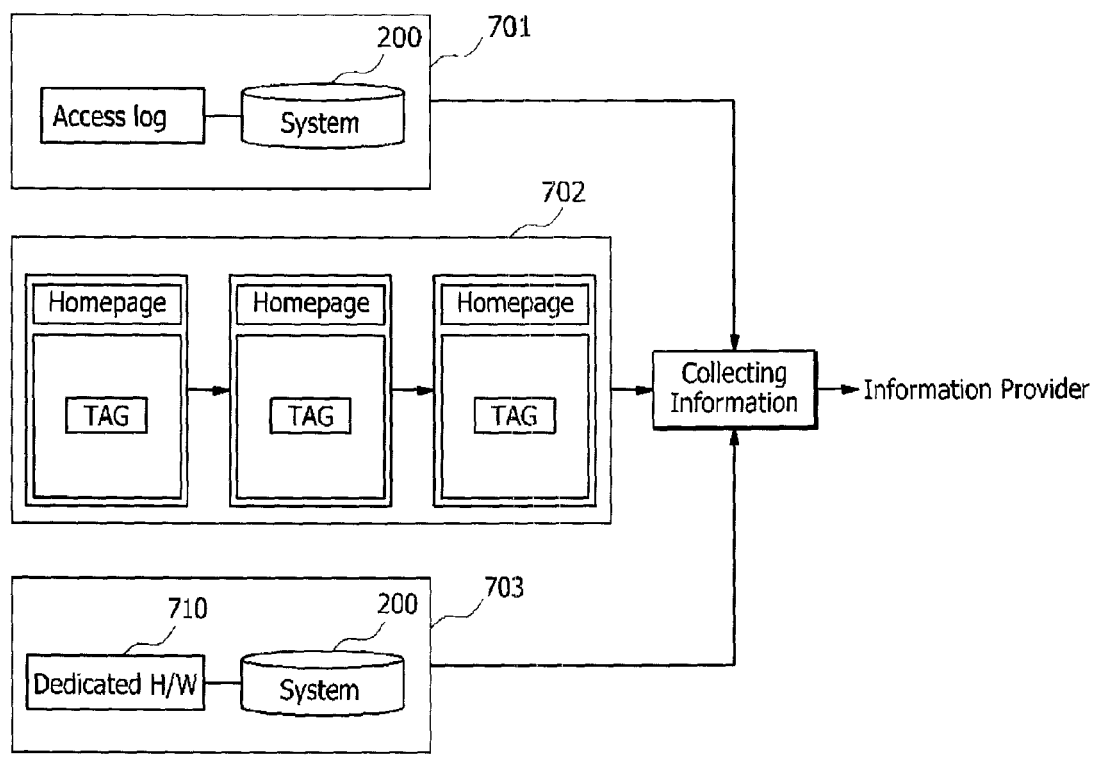
FIG. 45 is a view illustrating an example of homepage access history information.
FIG. 46 is a view illustrating a homepage access history information acquisition procedure.

FIG. 45 is a view illustrating an example of homepage access history information which is generated by the homepage access history information generation section 261 and is stored in the homepage access history information DB 262.

Referring to FIG. 45, the homepage access history information includes "Homepage No.", "Page View Number", "Access Keyword", "Access Date & Time", "Click Number", "Click Rate", "Conversion Number", "Conversion Rate", "Reply Number", and "Evaluation Quotient"

The "Page View Number" means the number of times through which a homepage is visited by information users, the "Access Keyword" means a keyword which is inputted by the information users, and the "Access Data & Time" means a date and time at which the information users accessed the homepage.

The "Click Number" means the click number of an advertisement when the homepage of an information provider is open by the advertisement, and the "Click Rate" means an advertisement click number/a display number, that is, a click number per an advertisement display number.

The "Conversion Number" means the number of information users who have conducted user registration, data request and product purchase in the homepage, and the "Conversion Rate" means the rate of the information users who have actually conducted user registration, data request and product purchase, among the information users who have accessed the homepage.

The "Reply Number" means the number of replies which the information users left in the bulletin board of the homepage, and the "Evaluation Quotient" means the number of information evaluators, who have conducted evaluation, and the contents of the evaluation. Namely, the "Evaluation Quotient" is a quotient that indicates an evaluation value (a reputation).

In an embodiment, an evaluation quotient for a restaurant can be realized in the following format on the homepage of the corresponding restaurant.

Taste ★★★★☆ (4)
Atmosphere ★★★★☆ (4)
Price ★★☆☆☆ (2)
Service ★★★☆☆ (3)
Satisfaction ★★★☆☆ (3)

FIG. 46 is a view illustrating a procedure in which the information included in the homepage access history information shown in FIG. 45 is acquired.

Referring to FIG. 46, the homepage access history information can be acquired in three ways.

A first acquisition way 701 is a way of using access logs wherein information left in the total homepage service providing system 200 by the browsers of the information appliances 100 of information users, that is, access logs are acquired through collection.

A second acquisition way 702 is a way of using tags wherein tags for collecting information are provided in all the pages constituting homepages and the information of the browsers of information appliances 100 which accessed the pages is acquired through collection and summing.

A third acquisition way 703 is a way of using a dedicated hardware wherein a hardware 710 dedicated for access analysis is installed on a network and access information between the information appliances 100 of information users and the total homepage service providing system 200 is acquired.

The information acquired using any one of the above-described ways is stored in the homepage access history information DB 262 as homepage access history information, and is provided to the information appliances 100 of information providers upon request.

Hereinbelow, functions of the supplementary service providing unit 270 will be described in detail.

The supplementary service providing section 271 can figure out the position of an information user from the information appliance 100 of the information user and provide information of homepages related with shops located within a predetermined distance from the position of the information user. In order to figure out the position of the infatuation user, a GPS (global positioning system) module is mounted to the information appliance 100 of the information user.

The supplementary service providing section 271 can issue and afford coupons, discount tickets, points, and so forth to information evaluators. This is to encourage evaluation of homepages and activate the use of the homepages.

The supplementary service providing section 271 can provide an advertisement service as a supplementary service in response to a request from an advertiser.

All data necessary for supplementary services, for example, coupons, discount tickets, advertisements, etc. are stored in the supplementary service providing DB 272.

Figure 47:
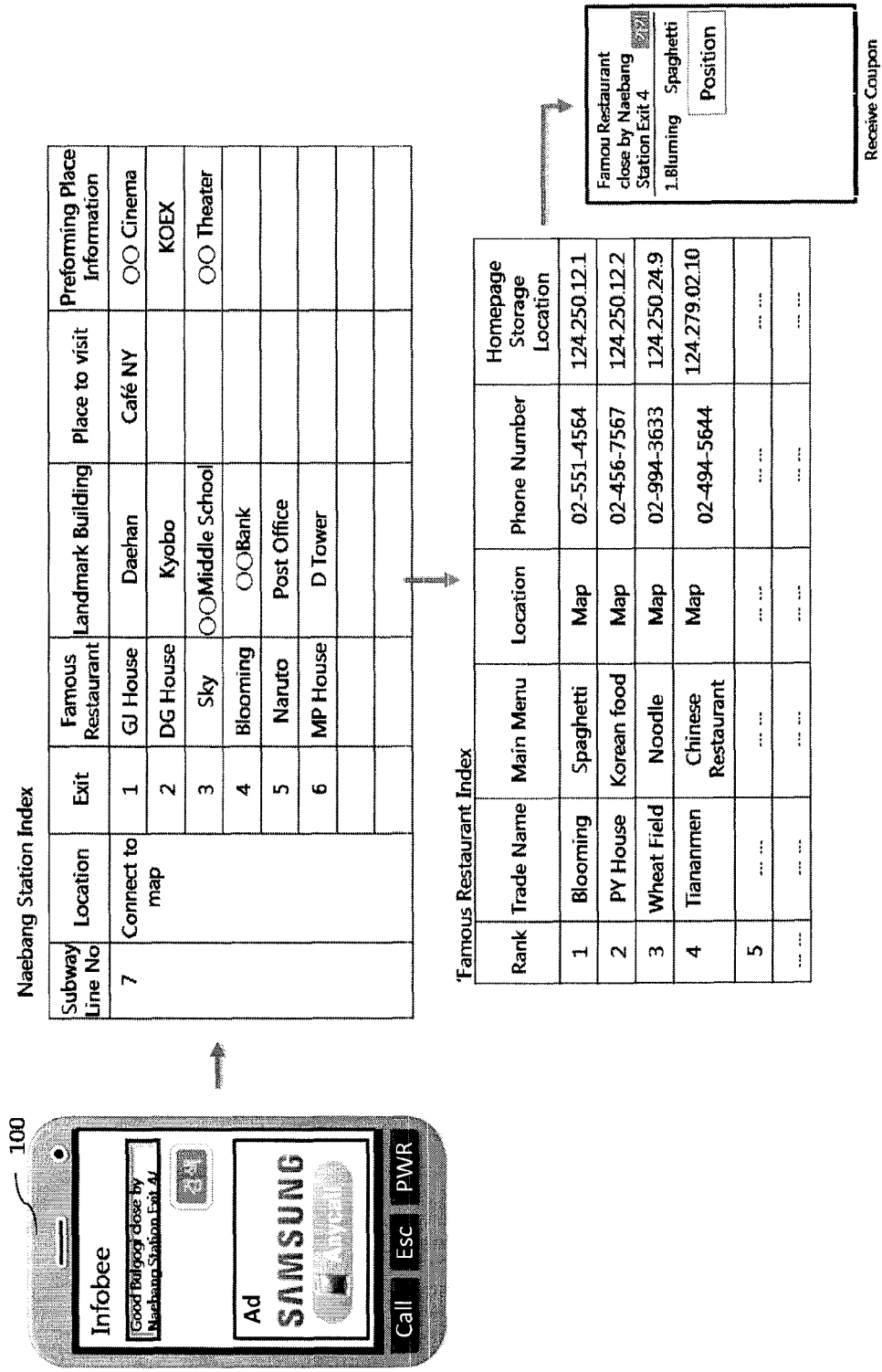
FIG. 47 is a view illustrating an example of a homepage index DB-based information search.

FIG. 47 is a view for additionally explaining a search result according to the search method shown in FIG. 43 and illustrates an example of an information search conducted based on the homepage index DB 242.

Referring to FIG. 47, if a search term of "Naebang Station Exit No. 4 Famous Restaurant" is inputted to the search box of the information appliance 100 of an information user by the information user, the homepage search section 251 extracts an index related with "Naebang Station" that is placed foremost in the transmitted search term, by referring to the search term dictionary 252.

In the case where "Naebang Station Index" as shown in FIG. 47 exists, the homepage search section 251 extracts an "Exit" item among the contents of the "Naebang Station Index", and then extracts a "No. 4" item from the "Exit" item.

Next, since "Exit No. 4" is a search term which indicates a position, the homepage search section 251 extracts "Blooming" from the "Naebang Station Index", which is positioned around the exit No. 4, searches again the "Blooming" searched from the "Naebang Station Index", from a "Famous Restaurant Index", and outputs that the taste evaluation rank of the "Blooming" is "1", as a search result.

The supplementary service providing section 271 outputs an advertisement to the information appliance 100 of the information user and provides a coupon for "Blooming".

Although preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A total homepage service providing system for providing homepage-related services in an incorporated manner to information appliances through network communication, the information appliances including an information appliance for an information provider, an information appliance for an information user and an information appliance for an information evaluator, the system comprising:
   a processor; and
   a computer readable storage medium containing executable instructions, wherein the executable instructions are grouped into at least the following units:
   an information provider information administration unit configured to register and administrate information of the information appliance of the information provider and information of the information provider who uses the information appliance of the information provider;
   a homepage generation unit configured to automatically generate a homepage which can be displayed on the information appliance of the information provider and the information appliance of the information user, using metadata received from the information appliance of the information provider;
   a homepage registration and administration unit configured to store a file of the generated homepage, and register and administrate the homepage; and
   an index generation and administration unit configured to generate one or more homepage indexes for an information search, using keywords extracted and classified from the generated homepage, and administrate the generated homepage indexes.

2. The total homepage service providing system according to claim 1, further comprising:
   a homepage search unit configured to conduct searches for homepages which are registered in the homepage registration and administration unit.

3. The total homepage service providing system according to claim 1, wherein the information provider information administration unit comprises:
   an information provider information administration database configured to store a metadata frame for registration of an information provider; and
   an information provider information administration section configured to read out the metadata frame for registration of an information provider, transmit the metadata frame to the information appliance of the information provider, store metadata for registration of an information provider, received from the information appliance of the information provider in correspondence to the metadata frame for registration of an information provider, in the information provider information administration database, and extract a homepage generation purpose of the information provider, from the metadata for registration of an information provider.

4. The total homepage service providing system according to claim 3, wherein the homepage generation unit comprises:
   a homepage generation database configured to store a plurality of homepage samples, a plurality of layout frames and a plurality of metadata frames for layout input, the plurality of layout frames and the plurality of metadata frames for layout input corresponding to the plurality of homepage samples, respectively; and
   wherein the homepage generation unit is configured to extract at least one homepage sample conforming to the homepage generation purpose of the information provider among the plurality of homepage samples, transmit the extracted homepage sample to the information appliance of the information provider, read out a layout frame and a metadata frame for layout input corresponding to a homepage sample selected by the information provider among the plurality of layout frames and the plurality of metadata frames for layout input, transmit the layout frame and the metadata frame for layout input to the information appliance of the information provider, generate a homepage layout file using metadata for layout input received from the information appliance of the information provider to be recorded in the homepage, and generate the homepage using the generated homepage layout file.

5. The total homepage service providing system according to claim 4, wherein the homepage layout file is generated using any one of HTML, XML, XHTML, PHP, JAVA, Flash and FLEX script languages.

6. The total homepage service providing system according to claim 4, wherein the homepage registration and administration unit comprises:
   a homepage file storage database configured to store the generated homepage layout file; a homepage registration server configured to register the generated homepage; and a homepage registration section configured to assign a URL to the homepage, extract information regarding the homepage from the homepage layout file, and register the URL of the homepage and the extracted information regarding the homepage in the homepage registration server.

7. The total homepage service providing system according to claim 6, wherein the index generation and administration unit comprises:
   a homepage index generation section configured to extract keywords from the metadata for registration of an information provider stored in the information provider information administration database or from the homepage layout file stored in the homepage file storage database, classify the information of the homepage registered in the homepage registration server by the keywords, and generate the homepage indexes; and
   a homepage index database configured to store the generated homepage indexes and administrate the stored homepage indexes.

8. The total homepage service providing system according to claim 7, wherein the homepage index generation section builds an evaluation term dictionary by extracting evaluation terms from evaluation information received from the information appliance of the information evaluator and registered in the homepage, generates reputation indexes using the built evaluation term dictionary, and stores the generated reputation indexes in the homepage index database.

9. The total homepage service providing system according to claim 8, wherein the reputation indexes are generated using reputations that are automatically collected through a reputation data collection crawler based on information of the homepage index database.

10. The total homepage service providing system according to claim 7, wherein the keywords are automatically extracted through a crawler.

11. The total homepage service providing system according to claim 6, wherein the homepage file storage database and the homepage registration server can be formed to be incorporated with each other.

12. The total homepage service providing system according to claim 6, wherein the homepage registration section corrects, updates and administrates information regarding homepages which are stored in the homepage registration server.

13. The total homepage service providing system according to claim 4, wherein the metadata frames for layout input can be formed to be incorporated into the plurality of layout frames.

14. The total homepage service providing system according to claim 2, wherein the homepage search unit comprises:
a search term dictionary having search terms stored therein; and a homepage search section configured to conduct searches for the homepages registered in the homepage registration and administration unit by using the search term dictionary in response to requests from the information appliances or an outside.

15. The total homepage service providing system according to claim 14, wherein the search terms can be produced in a single word type or a combination of at least two words, and can have compositions of "Location+Keyword" or "Adjective+Keyword".

16. The total homepage service providing system according to claim 1, further comprising:
a homepage access history information generation and administration unit including a homepage access history information generation section configured to generate homepage access history information, and a homepage access history information database configured to store the generated homepage access history information.

17. The total homepage service providing system according to claim 16, wherein the generated homepage access history information corresponds to access history information of the information appliances for the homepages registered in the homepage registration and administration unit.

18. The total homepage service providing system according to claim 1, further comprising:
a supplementary service providing unit configured to provide supplementary services to the information appliances.

19. The total homepage service providing system according to claim 18, wherein the supplementary services include at least any one of advertisement, coupon affording, discount ticket affording, and point affording.

20. The total homepage service providing system according to claim 18, wherein the supplementary service providing unit is linked with global positioning system modules which are mounted to the information appliances, and provides the supplementary services in correspondence to positions of the information appliances.

21. A total homepage service providing method for providing homepage-related services in an incorporated manner to information appliances through network communication, the information appliances including an information appliance for an information provider, an information appliance for an information user and an information appliance for an information evaluator, the method comprising:
an information provider registering step of registering information of the information appliance of the information provider and information of the information provider who uses the information appliance of the information provider;
a homepage generating step of automatically generating a homepage which can be displayed on the information appliance of the information provider and the information appliance of the information user, using metadata received from the information appliance of the information provider;
a homepage registering step of storing a file of the generated homepage in a homepage file storage database and registering the homepage in a homepage registration server;
a keyword extracting and classifying step of extracting keywords from the generated homepage and classifying the extracted keywords; and
an index generating step of generating at least one homepage index for information searches, using the keywords.

22. The total homepage service providing method according to claim 21, further comprising:
a search conducting step of conducting a search for homepages registered in the homepage registration server.

23. The total homepage service providing method according to claim 21, wherein the information provider registering step comprises the steps of:
transmitting a metadata frame for registration of an information provider to the information appliance of the information provider;
storing metadata for registration of an information provider, received from the information appliance of the information provider in correspondence to the metadata frame for registration of an information provider, in an information provider information administration database; and
extracting a homepage generation purpose of the information provider from the metadata for registration of an information provider.

24. The total homepage service providing method according to claim 23, wherein the homepage generating step comprises the steps of:
extracting one or more homepage samples, conforming to the extracted homepage generation purpose of the information provider, from a homepage generation database and transmitting the extracted homepage samples to the information appliance of the information provider;
reading out a layout frame and a metadata frame for layout input, which correspond to a homepage sample selected by the information provider among the transmitted homepage samples, from the homepage generation database, and transmitting the layout frame and the metadata frame for layout input to the information appliance of the information provider; generating a homepage layout file using metadata for layout input, received from the information appliance of the information provider in correspondence to the transmitted metadata frame for layout input; and
generating the homepage using the generated homepage layout file.

25. The total homepage service providing method according to claim 23, wherein the metadata flame for registration of an information provider includes a homepage sample for each homepage generation purpose, and a layout frame and a metadata frame for layout input, which correspond to the homepage sample.

26. The total homepage service providing method according to claim 24, wherein the homepage registering step comprises the steps of:
storing the generated homepage layout file in the homepage file storage database; assigning a URL to the generated homepage; and extracting information regarding the homepage from the generated homepage layout file, and register the URL of the homepage and the extracted information regarding the homepage in the homepage registration server.

27. The total homepage service providing method according to claim 26, wherein the URL can be assigned by being numericalized through identification numbers which are assigned to respective domain names or classifications.

28. The total homepage service providing method according to claim 26, further comprising the step of:
correcting, updating or administrating the information for the homepage stored in the homepage registration server.

29. The total homepage service providing method according to claim 28, wherein the index generating step comprises the steps of:
extracting keywords from the metadata for registration of an information provider stored in the information provider information administration database or from the homepage layout file stored in the homepage file storage database, and classifying the extracted keywords;
generating the homepage index by classifying information of homepages registered in the homepage registration server by the extracted keywords; and
storing the generated homepage index in a homepage index database.

30. The total homepage service providing method according to claim 29, further comprising the step of:
administrating homepage indexes stored in the homepage index database.

31. The total homepage service providing method according to claim 30, wherein the homepage indexes include a reputation index, and wherein the index generating step comprises the steps of:
accessing the homepages registered in the homepage registration server, and searching evaluation factors from evaluation pages of the accessed homepages by referring to an evaluation term dictionary;
sorting the homepages by the evaluation factors, using the searched evaluation factors and evaluation values for the searched evaluation factors; and
generating the reputation index using sort information.

32. The total homepage service providing method according to claim 22, wherein the search conducting step comprises the steps of:
checking if there is a homepage index in which a search term received from the information appliance is used as an index name, among the homepage indexes; and
extracting the corresponding homepage index and transmitting the extracted homepage index to the information appliance as a search result when it is checked that a homepage index in which a search term received from the information appliance is used as an index name exists.

33. The total homepage service providing method according to claim 32, wherein the search conducting step further comprises the step of:
generating a search result by referring to at least any one of the homepage file storage database, the homepage registration server and a homepage index database and transmitting the generated search result to the information appliance when it is checked that a homepage index in which a search term received from the information appliance is used as an index name does not exist.

34. The total homepage service providing method according to claim 21, further comprising the step of:
acquiring homepage access history information of the information appliances for the homepages registered in the homepage registration server.

35. The total homepage service providing method according to claim 34, wherein the acquired homepage access history information is stored in a homepage access history information database and is provided to the information appliances upon requests from the information appliances.

36. The total homepage service providing method according to claim 21, further comprising the step of:
providing at least any one supplementary service among advertisement, coupon affording, discount ticket affording, and point affording.

* * * * *